United States Patent [19]

Craig et al.

[11] 4,143,451

[45] Mar. 13, 1979

[54] METHOD OF MANUFACTURING A FLEXURE HINGE ASSEMBLY

[75] Inventors: Robert J. G. Craig, Malibu; Clifton T. Council, Woodland Hills; Jack F. Jansen, Thousand Oaks, all of Calif.

[73] Assignee: Litton Systems, Inc., Woodland Hills, Calif.

[21] Appl. No.: 673,605

[22] Filed: Apr. 5, 1976

[51] Int. Cl.² .................. B23P 9/00; B23P 17/00; G01C 19/22
[52] U.S. Cl. .................................. 29/434; 29/445; 74/5 F; 308/2 A
[58] Field of Search .............. 29/434, 445; 74/5 F; 308/2 A

[56] References Cited

U.S. PATENT DOCUMENTS

| | | | |
|---|---|---|---|
| 3,388,923 | 6/1968 | Maynard | 29/445 |
| 3,585,866 | 6/1971 | Ensinger | 64/27 R |
| 3,685,135 | 8/1972 | Letters | 29/445 |
| 3,700,290 | 10/1972 | Ensinger | 308/2 A |
| 3,811,172 | 5/1974 | Bilinski et al. | 29/445 |
| 3,833,988 | 9/1974 | Tobias | 29/445 |

*Primary Examiner*—C.W. Lanham
*Assistant Examiner*—Daniel C. Crane
*Attorney, Agent, or Firm*—Harold E. Gillmann

[57] ABSTRACT

A flexure hinge assembly comprising a pair of fixed telescopes inner and outer tubular members separated into at least one driving portion, at least one gimbal portion and at least one driven portion and a plurality of flexure blades all formed by a plurality of slots and apertures through the walls of each tubular member. Flexure blades are formed by pairs of adjacent apertures with the slots interconnecting apertures to separate the tubular members into the driving, gimbal, and driven portions. A pair of diametrically opposed flexure hinges, each comprising two mutually orthogonal flexure blades one in the outer and one in the inner member, connect each gimbal portion to the driving portion. Another such pair of flexure hinges connect each gimbal portion to the driven portion.

The common plane of flexure of two of the four flexure blades of each tubular member forms a first angle with respect to the common axis of the inner and outer tubular members, the common plane of flexure of the two other flexure blades of each tubular member forms a second angle with respect to the common axis of the inner and outer tubular members, and the difference between the first angle of two flexure blades of each member and the second angle of the other two flexure blades of that member being substantially 90°.

The crossed flexure blades are fabricated by forming the apertures with the inner and outer tubular members coaxially aligned in a first relative angular position and then rotating the tubular members with respect to one another through a predetermined angle of rotation into a second relative angular position of the tubular members to create four flexure hinges spaced 90° apart.

15 Claims, 37 Drawing Figures

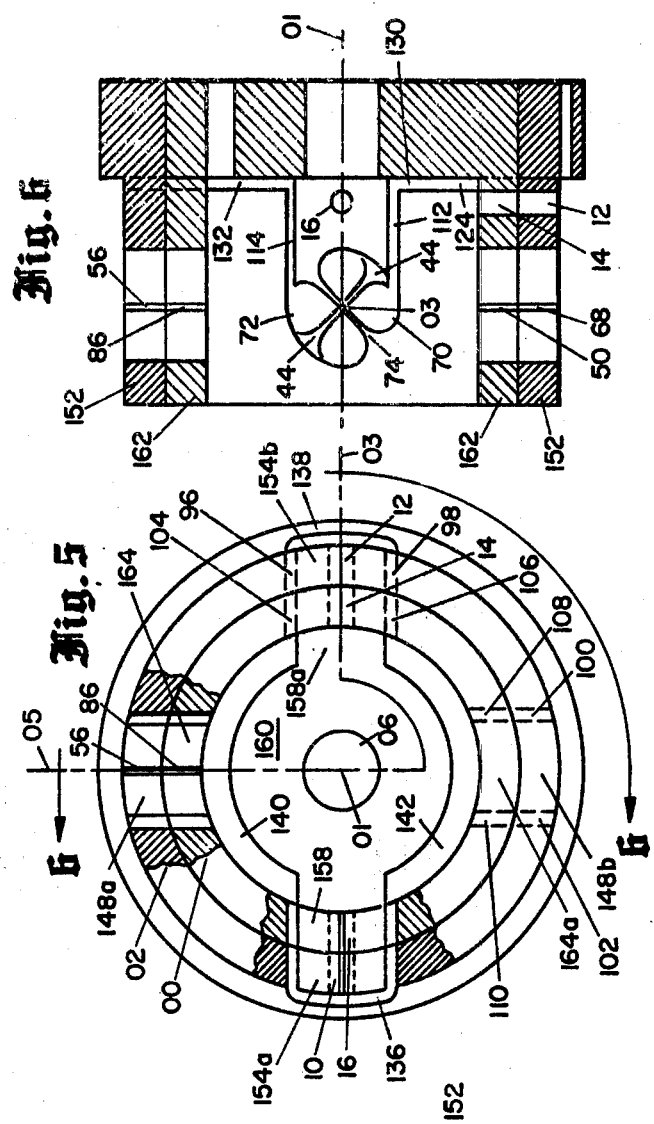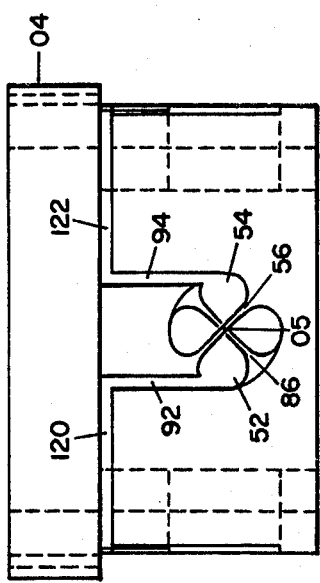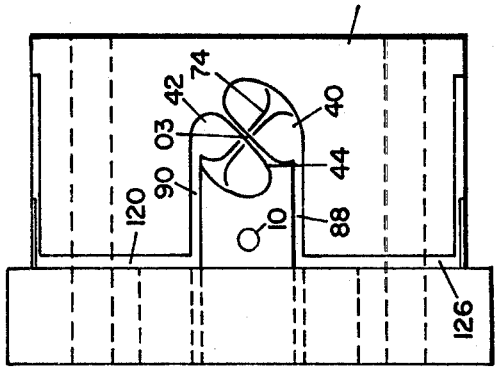

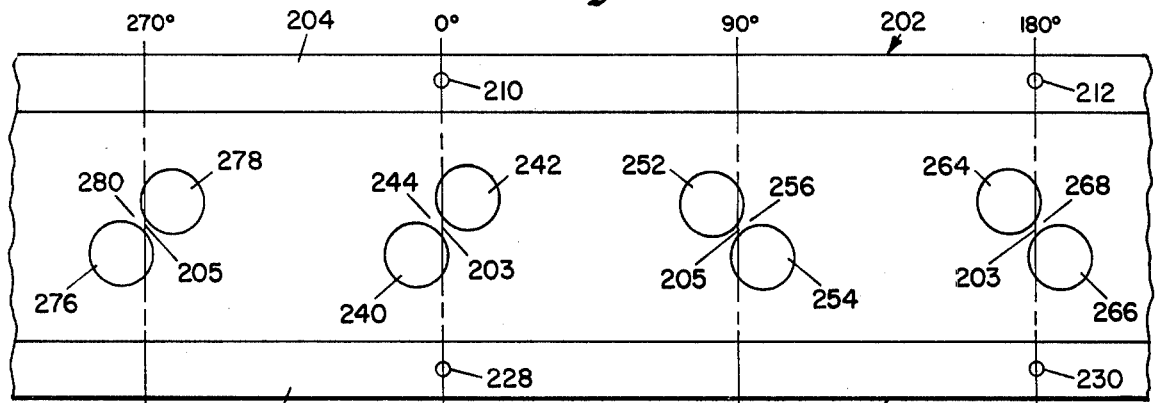
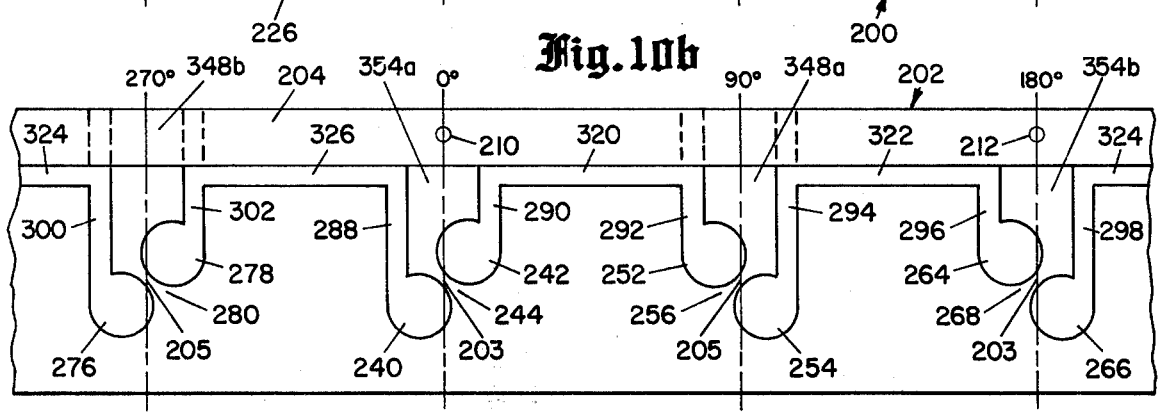
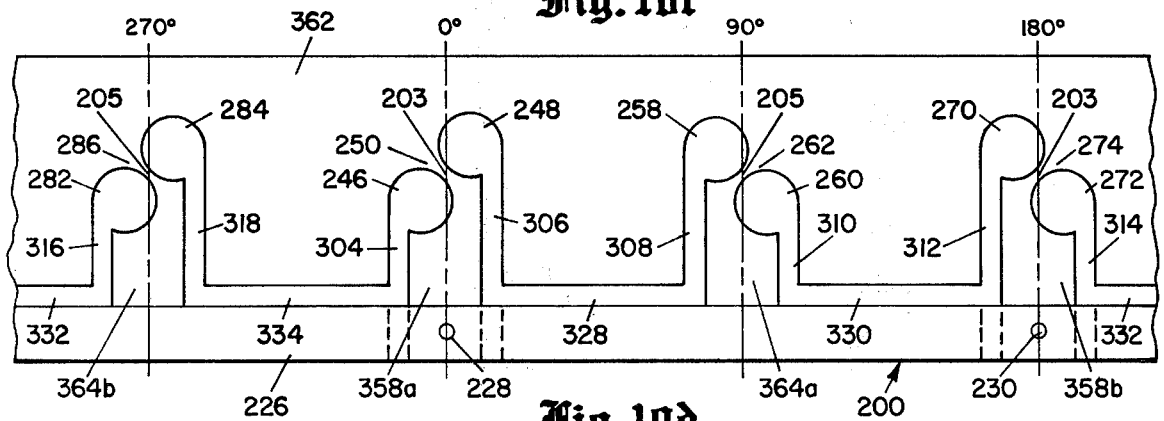
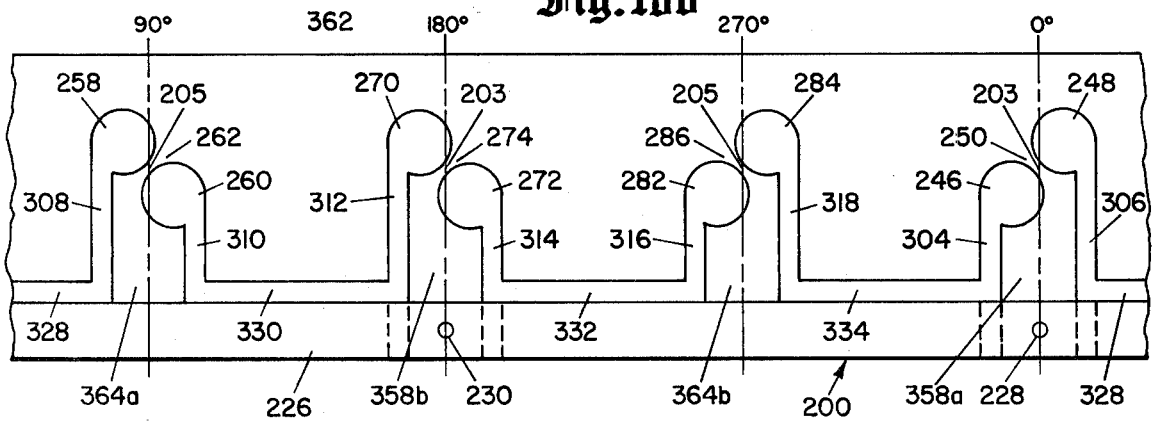

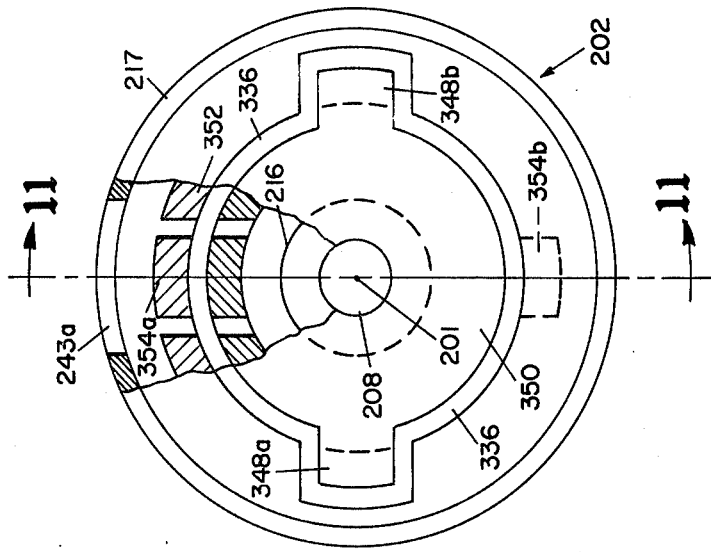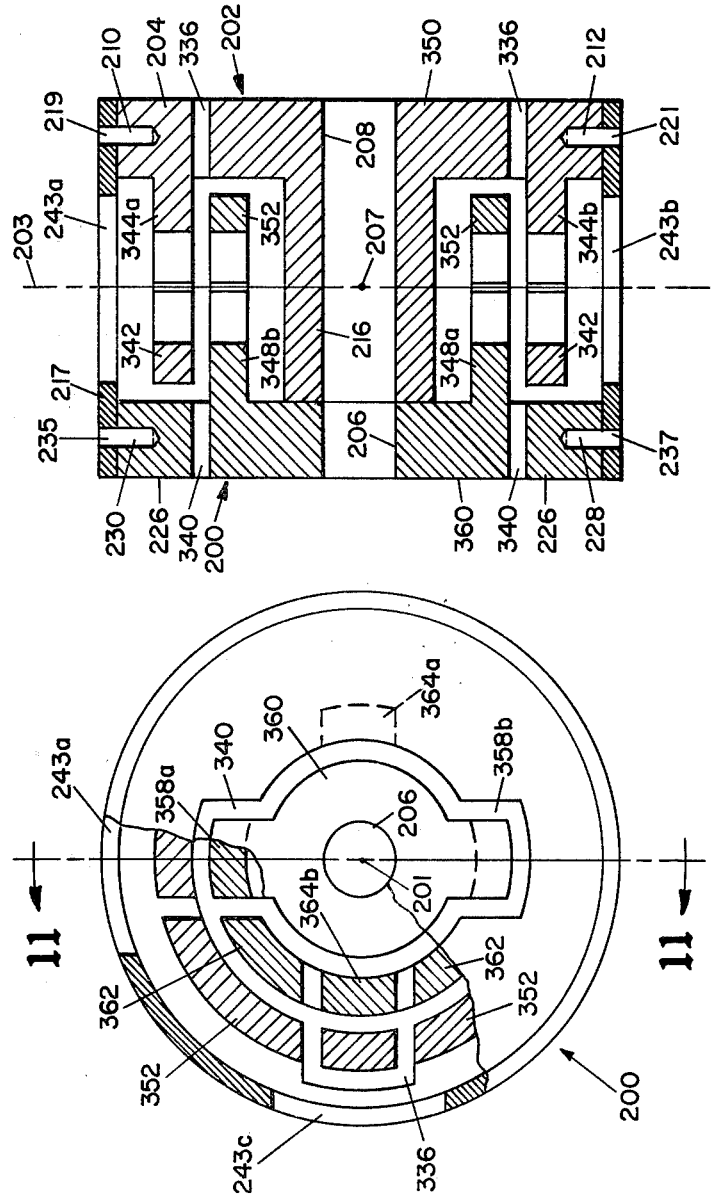

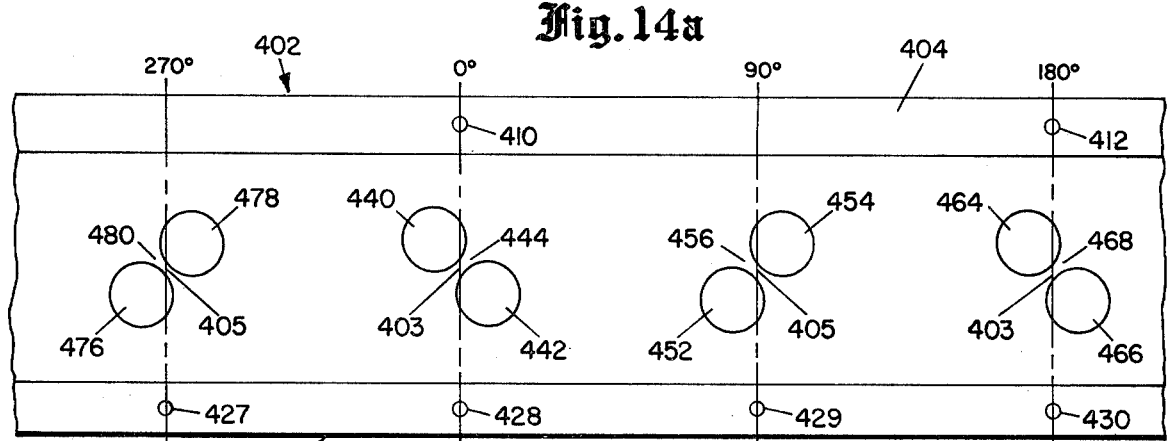
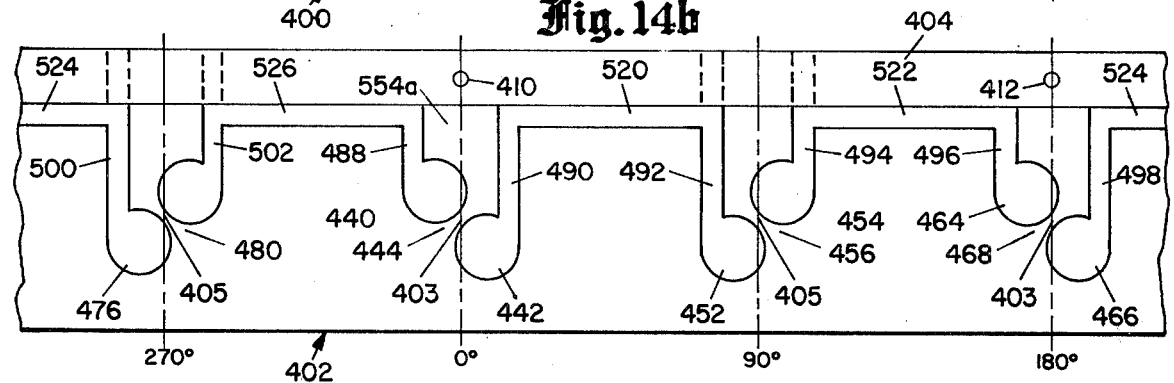
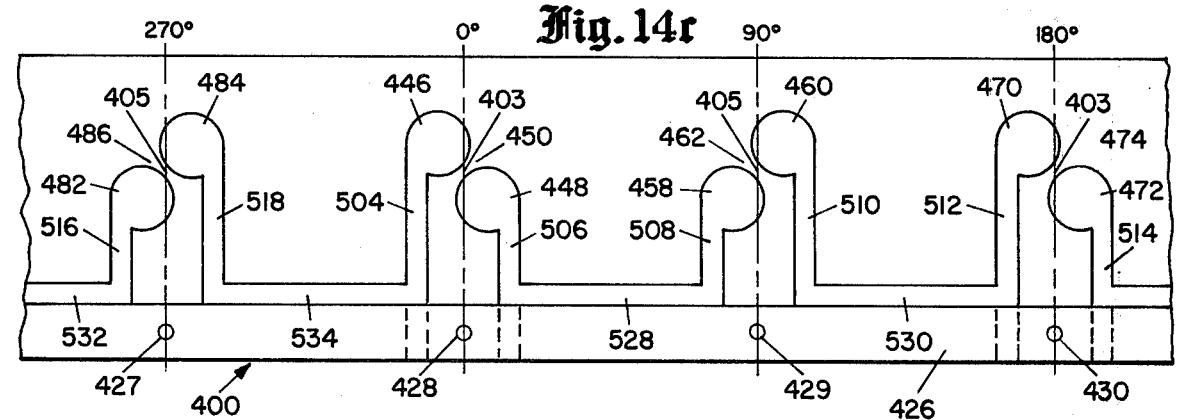
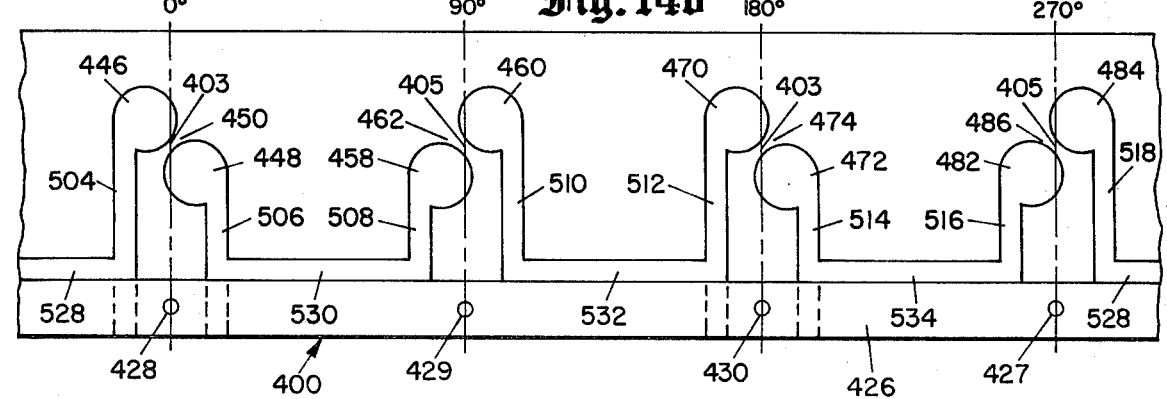

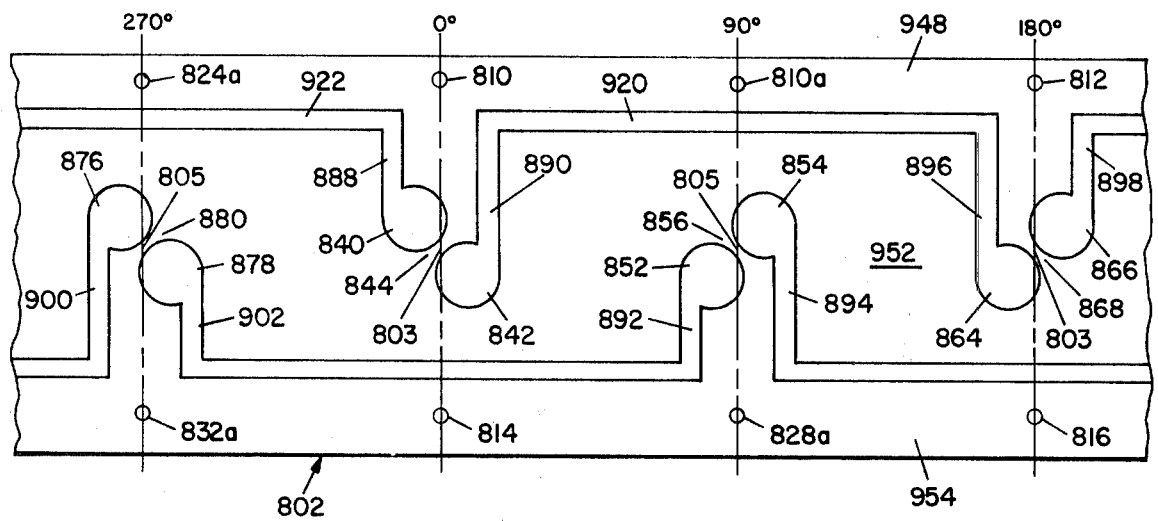
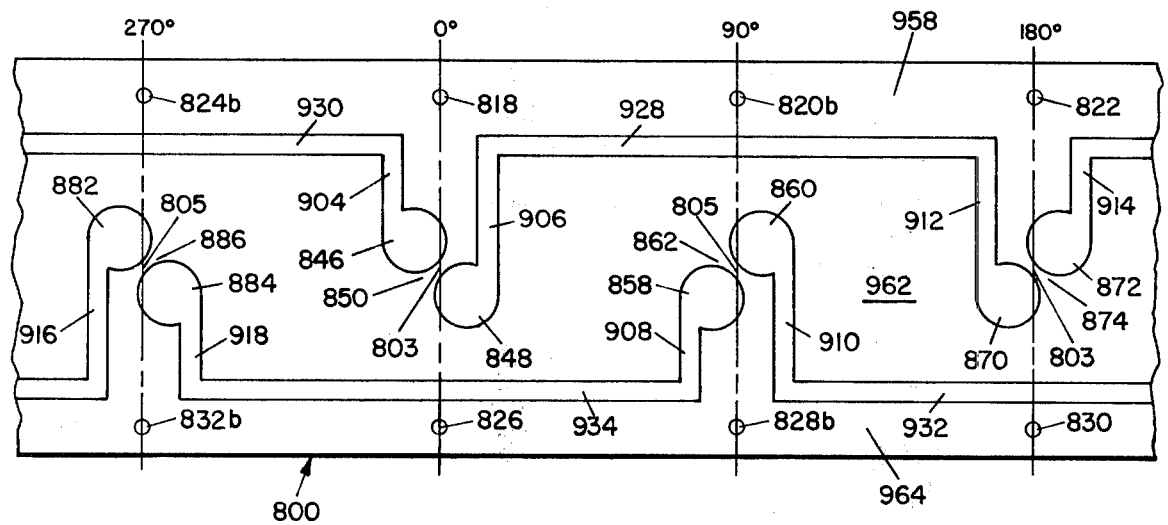
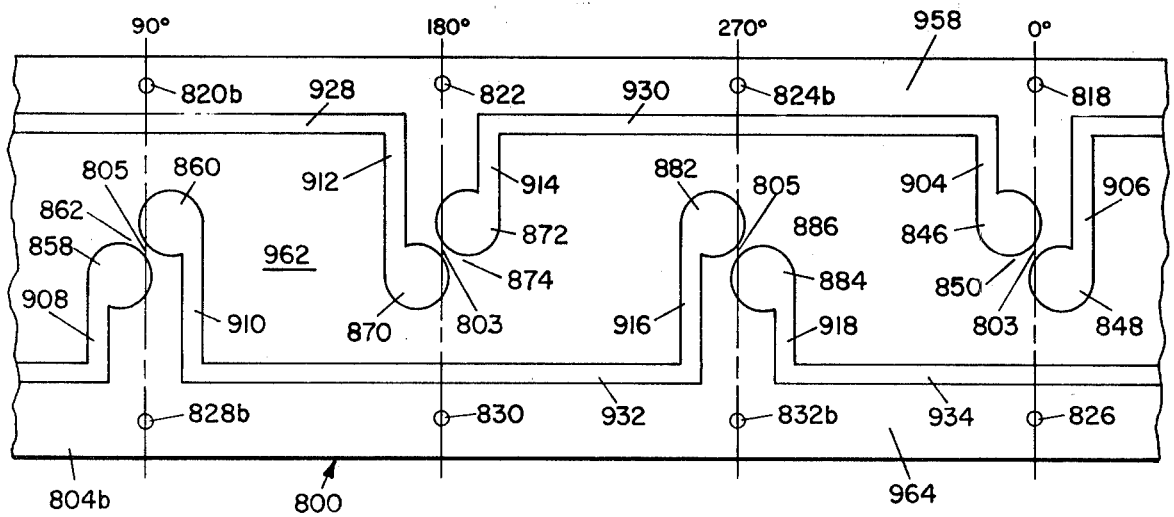

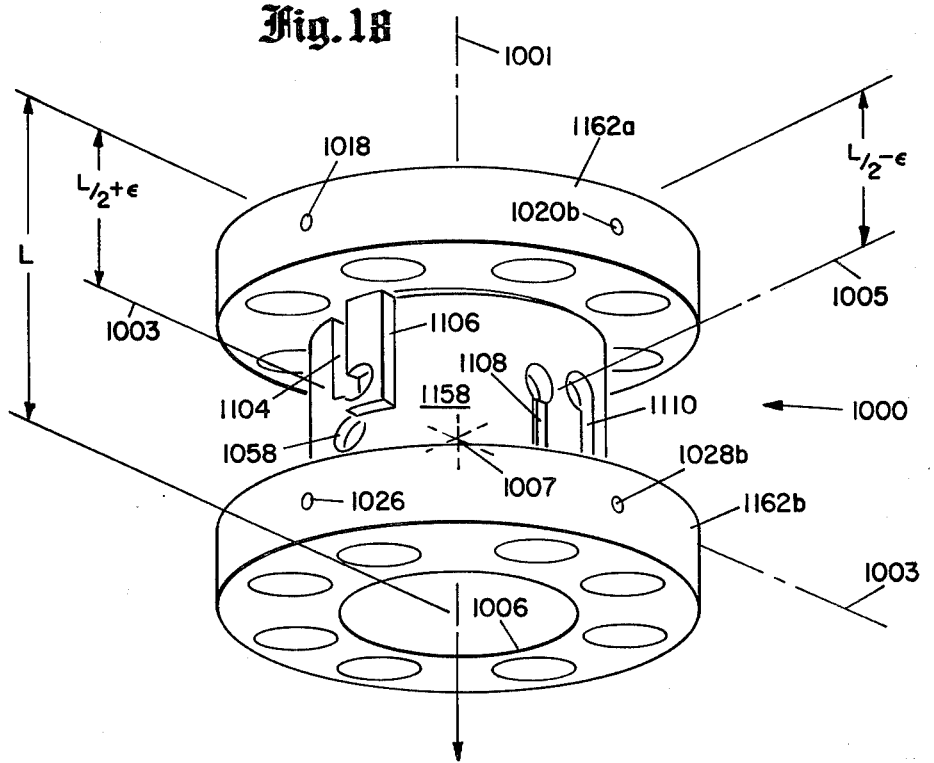
Fig. 18
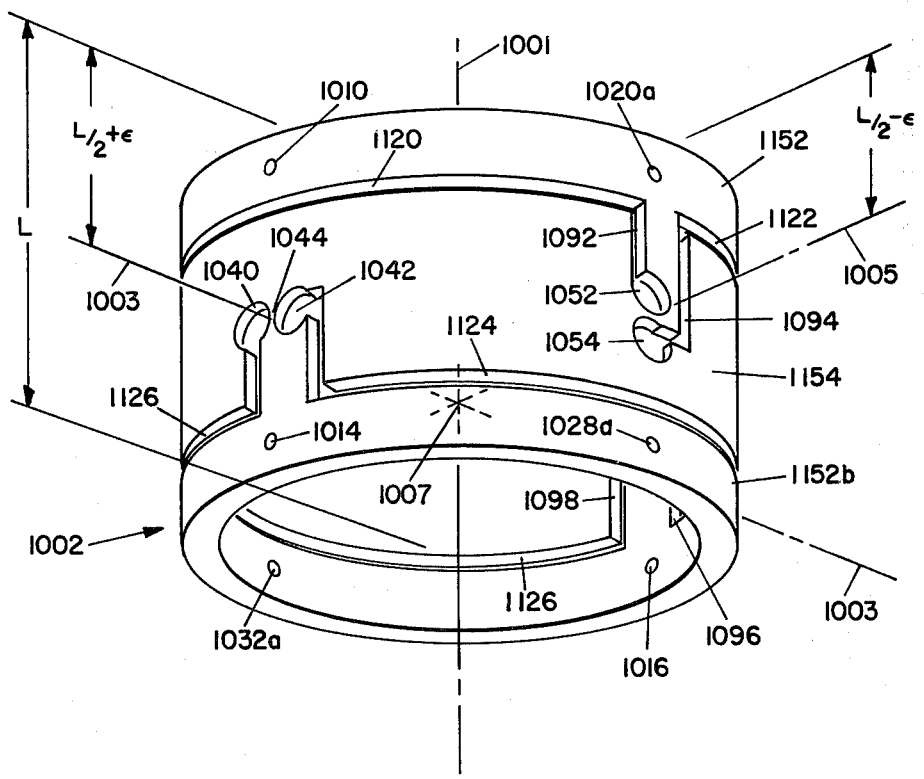

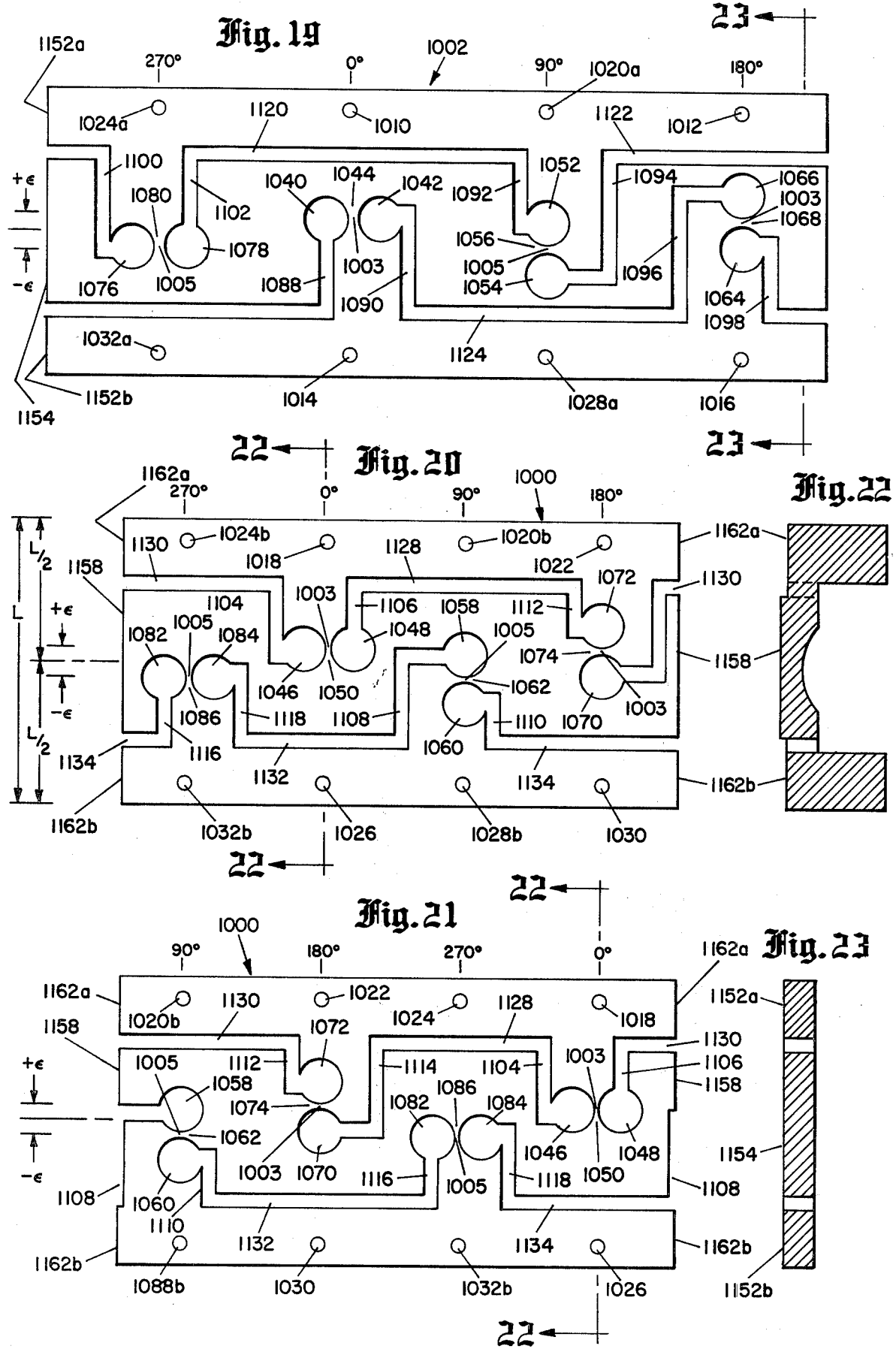

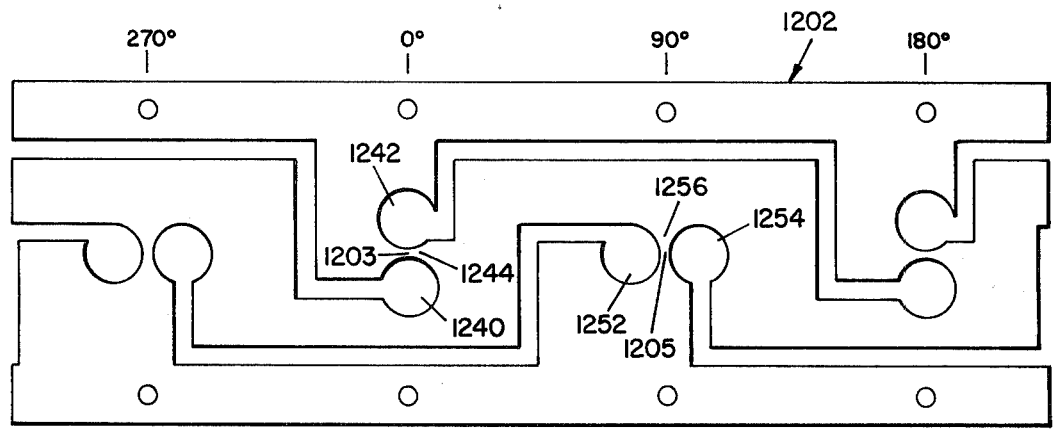
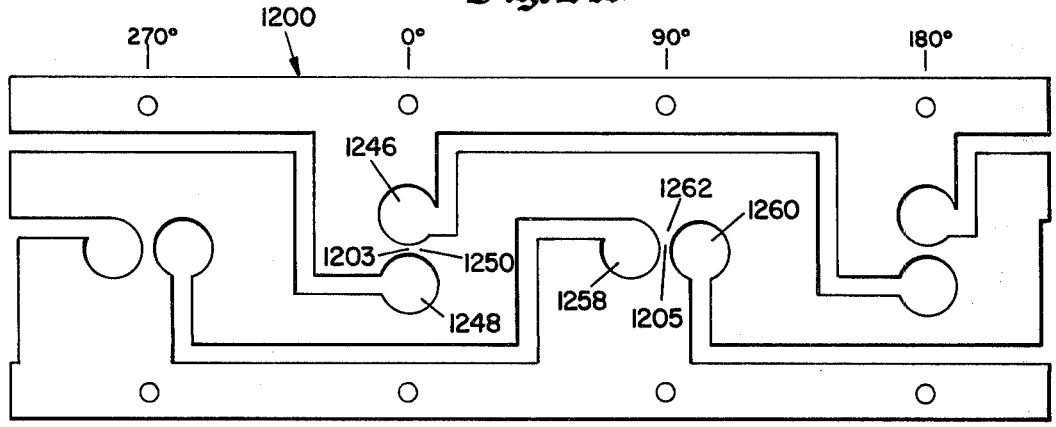
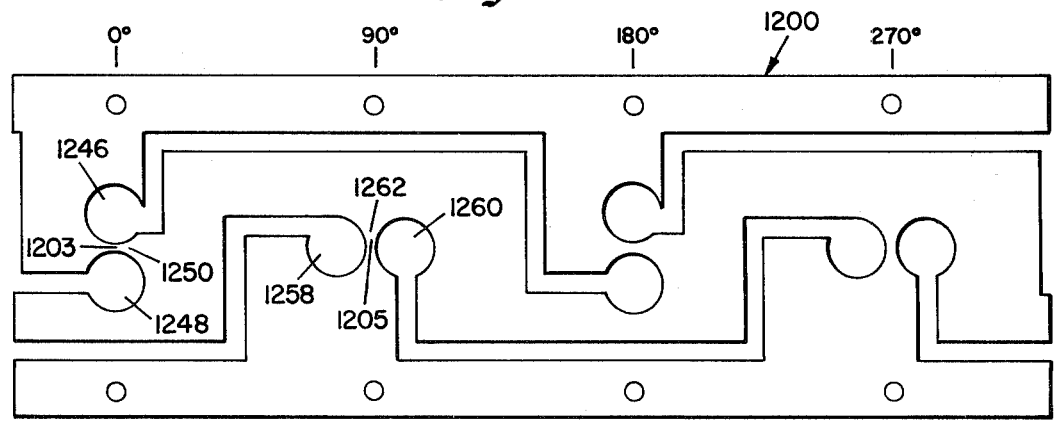

METHOD OF MANUFACTURING A FLEXURE HINGE ASSEMBLY

This application is related to U.S. Pat. No. 4,114,402 which issued Sept. 19, 1978 to Robert J. G. Craig, et al for a "Flexure Hinge Assembly". It is also related to U.S. Pat. No. 4,062,600 which issued Dec. 13, 1977 to Stanley F. Wyse for a "Dual-Gimbal Gyroscope Flexure Suspension". These patents were applied for on Apr. 5, 1976, the filing date of this patent. They are assigned to Litton Systems, Inc., the assignee of this patent.

Patent Application, Ser. No. 906,223, filed May 15, 1978 is a divisional application of this patent application.

BACKGROUND OF THE INVENTION

This invention relates to a flexure hinge assembly, and, more particularly, to such an assembly for connecting two rotary members while permitting universal movement of one with respect to the other through small angles.

A typical flexure hinge assembly of the prior art is disclosed in U.S. Pat. No. 3,811,172. Other prior art flexure hinge assemblies are referred to and discussed in the last section of this specification, entitled "Discussion of the Prior Art". In the device disclosed in U.S. Pat. No. 3,811,172 and in all but one of the devices disclosed in other patents, an inner tubular member and an outer tubular member are each divided into two end portions and an intermediate portion by pairs of diametrically opposed flexure blades formed in the wall of each member. The flexure hinge assembly thus formed has two pairs of diametrically oppositely located flexure hinges which permit universal movement through small angles between a central gimbal element portion and one end portion thereof and has two pairs of oppositely disposed flexure hinges which permit universal movement through small angles between the central portion of the gimbal element and the other end portion of the flexure hinge assembly.

Each aperture in each pair of circumferentially adjacent apertures is connected by a slot to a circumferentially spaced aperture not in the pair of apertures.

The slot-aperture pattern subdivides each tubular member into at least two portions interconnected by the blades exlusively.

Any one of the portions between a slot-apertures series and one of the circular edges of the tubular member or another such series is - or forms a part of - a gimbal, driven or driving element. cutouts around the tubular members separate them into substantially ring-shaped elements, except for the flexure blades.

Each flexure hinge comprises a pair of flexure blades with mutually orthogonal planes of flexure. One flexure blade of each pair in a flexure hinge is formed by a pair of circumferentially adjacent apertures in the wall of the inner tubular member, the other being formed by a pair of circumferentially adjacent apertures in the outer tubular member. A flexure blade may be used where required angular motion about a compliant axis is limited and zero friction and backlash are of prime importance. A flexure blade is a mechanical member which is compliant in bending about one axis but rigid about the cross axes. The term compliance, as used herein, is the reciprocal of the spring rate.

Also, in prior art devices one of the flexure blades in each flexure hinge formed by a pair of flexure blades is oriented to contribute great axial strength along the longitudinal axes of the flexure hinge assembly, and the other blade of the same pair is orthogonally oriented to provide the necessary radial stiffness required for an isoelastic suspension.

However, in the known method of producing an assembly of the prior art, the thin flexure blades in each of the concentric inner and outer tubular members are formed by separately machining four pairs of equiangularly spaced circumferentially adjacent apertures in the walls of one tubular member, and machining four pair of equiangularly spaced, circumferentially adjacent apertures in the walls of the other tubular member to bring them into a coaxial positional relationship. This separate machining of pairs of adjacent apertures to form flexure blades to the degree of accuracy required for use of the flexure hinge assembly in gyroscope instruments is extremely difficult and time consuming. Each radially adjacent pair of flexure blades of which one blade is in the wall of the inner and the other blade is in the outer tubular member, must have a common, colineal flexure axis. The flexure axes of all the flexure hinge assemblies should intersect as accurately as possible, at a common center constituting the pivot point and lying on the longitundinal axis of the flexure hinge assembly. As a result of the prior art method of machining apertures forming flexure blades separately and individually in one and in the other of the tubular members, slight misalignment between the flexure axes of the inner and outer tubular members frequently occurs upon assembly. This leads to the introduction of excessive and unsymmetrical spring rates and other sources of malfunction in the finished flexure hinge assembly. Further, the formation of flexure blades according to the method of the prior art results in flexure blades which have a non-uniform thickness across their respective flexure axes, i.e., bending axes, which results in differences in the spring rates of the flexure blades.

One application for a universal joint for small angle deflections is a free gyroscope. A free gyroscope having a spinning rotor element, when mounted on a supporting structure, operates in such a manner that the supporting structure can be turned or translated without applying disturbing torques to the rotor element. In a practical device, control torques are applied to the rotor element for precessing the rotor element in a controlled manner. A free gyroscope customarily includes angular sensing devices for detecting angular misalignment between the spin axis of its rotor element, frequently called the rotor, and either its shaft axis or a housing-fixed axis. The angular misalignment so detected may then be used, after appropriate application, to apply a torque to a supporting structure, such as a gimbal element of an inertial platform, to cause the supporting structure to follow the rotor spin axis, thereby nulling the angular misalignment. Alternatively, a sensed angular misalignment may be utilized to apply a torque directly to the rotor element in what is known as "caged" or "captured" operation.

SUMMARY OF THE INVENTION

The above mentioned and other disadvantages of flexure hinges of the prior art are overcome by the novel flexure hinge assembly of the invention and the novel method of fabrication thereof. The novel flexure hinge assembly of the present invention comprises a pair of concentric inner and outer tubular members, each tubular member being divided into at least one driving element portion at least one gimbal element portion and at least one driven element portion with interconnections formed by a plurality of flexure blades, the division being the result of a plurality of slots through the walls of each tubular member, each end of each slot terminating in an aperture. Thus, it will be seen better from the detailed description, a series of slots around the periphery of a tubular member divide such tubular member, except for the remaining, connecting flexure blades between terminal apertures of slots. The apertures are arranged in pairs of circumferentially adjacent apertures. Each of the tubular members has four pairs of circumferentially adjacent apertures. In each member, the four pairs of apertures are equiangularly spaced around the circumference of the tubular member, with each pair of adjacent apertures in the tubular member forming a flexure blade. The two blades of each pair of radially adjacent flexure blades, one in the inner and one in the outer member, define mutually orthogonal planes of flexure and also define a common flexure axis to form a flexure hinge. In most embodiments of the invention, the flexure axes of all flexure hinges intersect the longitudinal, i.e., the cylinder, or common axis of the inner and outer tubular members at a common pivot point although this need not necessarily be so. According to the invention, the common plane of flexure of two of the four flexure blades of each tubular member forms a first angle with respect to the common axis of the inner and outer tubular members, the common plane of flexure of the two other flexure blades of each tubular member forms a second angle with respect to the common axis of the inner and outer tubular members, and the difference between the first angle of two flexure blades of each member and the second angle of the other two flexure blades of that member is substantially 90°.

The novel flexure hinge assembly is fabricated by holding the inner and outer tubular members coaxially aligned in a first relative angular position; creating a plurality of flexure blades by forming at least two pairs of apertures, the two apertures of each pair being circumferentially adjacent one to the other, such a pair being formed in the outer tubular member and in the inner tubular member with the inner pair being radially adjacent to the outer pair; rotating the tubular members with respect to one another through a predetermined angle of rotation into a second relative angular position of the tubular members in which second position pairs of mutually orthogonal flexure blades, one blade in the inner tubular member and one blade in the outer tubular member, creating four flexure hinges spaced 90° apart; and securing the inner and outer tubular members to one another in that second position. In most embodiments the flexure axes of the flexure hinges intersect the longitudinal axis of the tubular members at a common pivot point.

The predetermined angle of rotation of one tubular member with respect to the other is 180° where the pattern of apertures is selected with the flexure planes of a first pair of circumferentially consecutive flexure blades in one tubular member forming the same first angle of 90° with respect to the common axis of the tubular members and the flexure planes of a second pair of circumferentially spaced flexure blades of that same tubular member forming the same second angle with respect to the common axis, the second angle differing from the first angle by substantially 90°.

The predetermined angle of rotation is 90° where the flexure planes of a first pair of flexure blades, which are alternately spaced about the circumference of one tubular member and which have a first common flexure axis, form the same first angle with respect to the common axis, where the flexure planes of the other pair of flexure blades have a second common flexure axis orthogonally oriented with respect to the common first flexure axis and where the flexure planes of this second pair of flexure blades form the same second angle with respect to longitudinal axis, the second angle differing from the first angle by substantially 90°.

This first angle of the flexure planes, when measured with respect to the longitudinal axis, is selected to provide substantially equal translational stiffness in the axial and radial directions. Although it is not appreciated in some prior art teachings, it is not necessary that this first angle be limited to zero or 90°. In the preferred embodiment of the invention, the first angle is approximately 45°. The optimal magnitude of the first angle is a function of the particular design of flexure blades, apertures and slots utilized.

The flexure hinge assembly further comprises at least one driving element, at least one gimbal element, and at least one driven element which are formed by creating the above mentioned slots in the inner and outer tubular members, thereby to divide these members into a gimbal element connected to a driving element and connected to a driven element by flexure blades.

It is therefore an object of the invention to provide an improved flexure hinge assembly for gyroscopes and other applications which may be manufactured in a simpler manner than the prior art flexure hinge assemblies and with greater accuracy of manufacture.

It is another object of the invention to provide a method of fabricating a flexure hinge assembly which produces a flexure hinge assembly having flexure axes which precisely intersect the longitudinal axis of the flexure hinge assembly at a common pivot point.

It is a specific object of the invention to provide a flexure hinge assembly comprising a pair of inner and outer tubular members with flexure blades therein, wherein the flexure blades are each formed between a pair of circumferentially adjacent apertures and wherein each flexure blade in one of the tubular members is fabricated with its plane of flexure coplanar with the plane of flexure of a radially adjacent flexure blade in the other member in a first relative angular position of the inner and outer tubular members and, wherein flexure hinges which have substantially equal translational stiffness in the axial and radial directions are created by rotating the tubular members with respect to each other into a second relative angular position, wherein the flexure plane of each flexure blade in the inner tubular member is mutually orthogonal to the plane of flexure of another radially adjacent flexure blade in the outer tubular member.

It is a further object of the invention to provide a method of fabricating a flexure hinge assembly which minimizes the differences in stiffness about the principal flexure axes of the flexure hinge assembly.

It is yet another object of the invention to provide a method of fabricating a flexure hinge assembly which maximizes the symmetry of the flexure hinge assembly.

It is still another object of the invention to produce a flexure hinge assembly which, during operation, cancels rectified torques which are created by angular vibrations occurring at twice the rotational speed of the flexure hinge assembly.

It is a general object of the invention to provide a flexure hinge assembly that can be easily fabricated with a saving not only of time but also of costs.

It is also a general object of the invention to provide a universal joint whose basic operating parameters are inherently optimized.

It is a still further general object of the invention to provide a universal joint having at least two gimbal elements wherein the flexure axes of each gimbal element have a predetermined angular orientation with respect to the corresponding flexure axes of the other gimbal element, or elements.

It is yet another general object of the invention to provide a universal joint having substantially equal translational stiffness in both radial and axial directions.

It is a more specific object of the invention to provide a universal joint having at least two gimbal elements with its center of gravity at the center of suspension of the universal joint.

It is another specific object of the invention to provide a universal joint having at least two gimbal elements suspended by a plurality of flexure hinges, wherein the flexure axes of each gimbal element intersect one another at a common pivot point.

It is a still further general object of the invention to provide a flexure hinge assembly which cancels rectified torques which are created because of translational vibrations along the longitudinal axis of the flexure hinge assembly and which occur at twice the rotational speed of the flexure hinge assembly when in operation.

DESCRIPTION OF THE DRAWINGS

FIGS. 5, 6, 7 and 8 constitute a set of orthographic projections, partly in cross section, of the completed flexure hinge assembly having a single gimbal element, as produced from the tubular members, of FIGS. 1–4, after rotation of one tubular member with respect to the other;

FIGS. 10a, 10b, 10c and 10d are each a developed view of one of the tubular members of the embodiment of FIG. 9 illustrating the method of fabricating this embodiment, particularly the layout of the apertures and slots therein;

FIGS. 11, 12 and 13 constitute a set of orthographic projections of the embodiment of FIG. 9, partly in cross section, FIGS. 14a, 14b, 14c and 14d are each a developed view of one of the tubular members of a third embodiment, similar to the embodiment of FIG. 9, these FIGURES illustrating the method of fabrication of this embodiment and the layout of apertures and slots therein;

FIGS. 17a, 17b and 17c are each a developed view of one of the tubular members of a fifth embodiment, similar to the embodiment of FIG. 15, these FIGURES illustrating the method of fabricating this embodiment and the layout of apertures and slots therein;

FIG. 18 is an exploded, perspective view of a sixth embodiment of the invention having a pair of independent intermediate vibrating gimbal elements, the centers of gravity of the two gimbal elements being displaced in opposite directions from the common pivot point;

FIGS. 19, 20 and 21 are each a developed view of one of the tubular members, illustrating the layout of apertures and slots, of the embodiment of FIG. 18 and the method of fabricating this embodiment;

FIG. 22 is a cross section of the inner tubular member shown in FIGS. 20 and 21;

FIG. 23 is a cross section of the outer tubular member shown in FIG. 19;

FIGS. 24a, 24b and 24c are each a developed view of one of the tubular members of a seventh embodiment of the invention, similar to the embodiment shown in FIG. 15, illustrating an alternate layout of the apertures and slots therein.

DESCRIPTION OF THE PREFERRED EMBODIMENTS AND METHOD AND OTHER EMBODIMENTS AND METHODS

Figure 15:
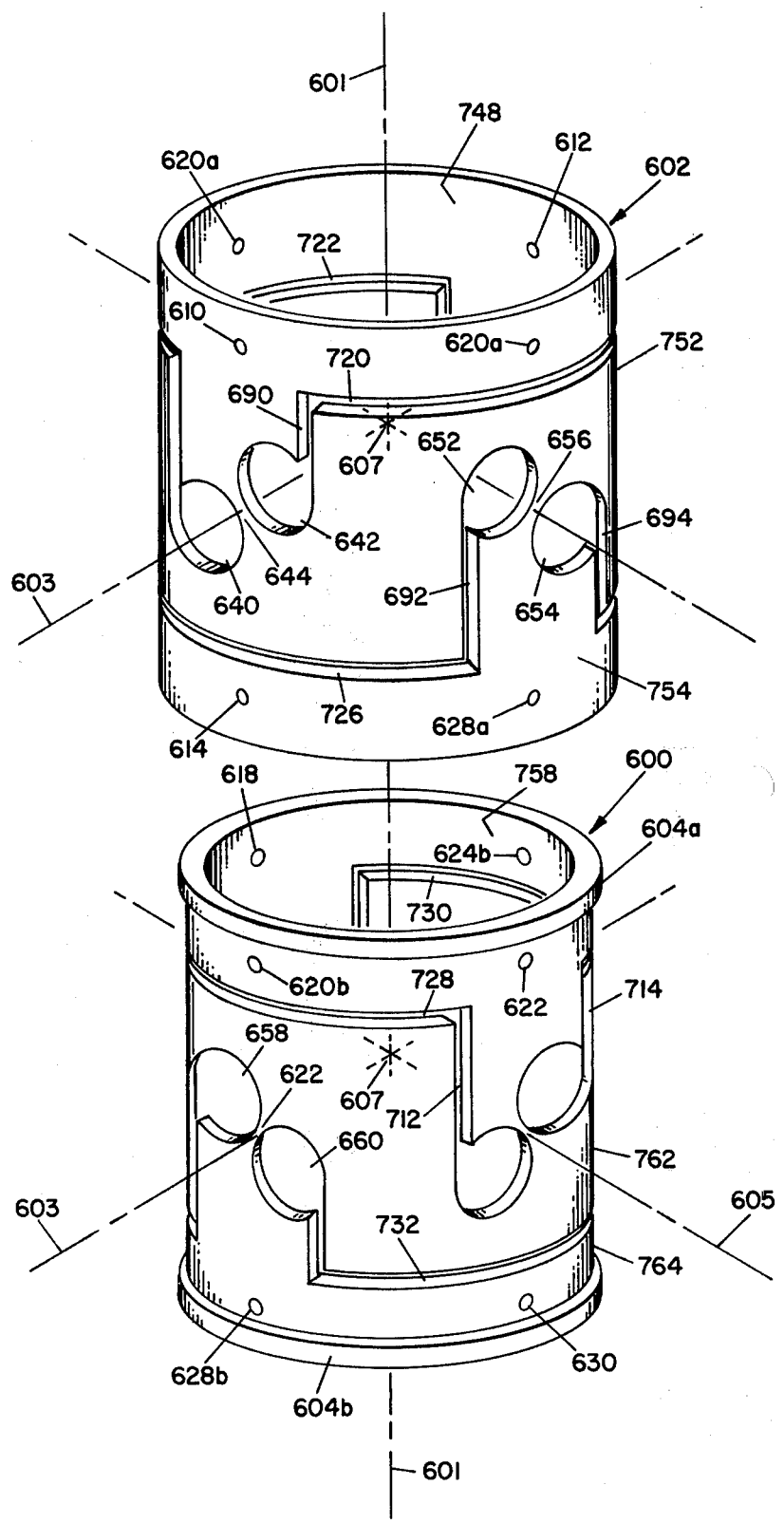
FIG. 15 is an exploded, perspective view, of a fourth embodiment of the invention comprising two coaxial right cylinders.

The method of making the embodiments of the invention is discussed particularly in connection with a description of the preferred embodiment shown in FIGS. 1–8. The following description of the method of manufacture for the embodiment of FIGS. 1–8 is, in general, also applicable to the manufacture of the other embodiments shown in FIGS. 9–13; FIG. 14; FIGS. 15–16; FIG. 17; FIGS. 18–23; and FIG. 24. Following the general discussion of the method of manufacture of the embodiment of FIGS. 1–8 there is a discussion of the differences in applying the method to the manufacture of the other embodiments. Table 1 summarizes the method of manufacture of all embodiments except the embodiment of FIG. 24. Table 2 sets forth modifications to the general method of manufacture summarized in Table 1 which comprise the preferred method of manufacture of some embodiments of the invention. The method set forth in Table 2 is fully applicable to the embodiment shown in FIGS. 1–8 and FIG. 17, and, as noted therein, partially applicable to the embodiment shown in FIGS. 9–13 and FIGS. 18–23 and is inapplicable to the embodiments shown in FIG. 14 and FIGS. 15–17. Table 2 is not a complete statement of the alternative method but must be read in conjunction with Table 1.

Numbering of the items of each embodiment shown begins with 00, 200, 400, 600, 800 and 1000. Beginning with the reference numerals 40, 240, ... 1040 the mutually corresponding items of each embodiment are numbered at intervals of 200. For example, apertures 40, 240, 440, 640, 840 and 1040 correspond to one another, i.e., each is one of the two apertures forming a flexure blade at the 0° position of the outer tubular member. For items numbers 00–40, 100–140, etc. there is partial but not full correspondence in the numbering of items at intervals of 200. Tooling and geometrical axes are given odd reference numerals. Items of the embodiments are given even numbers.

Numbered items in Tables 1 and 2 preceded by an asterisk * are not shown, mostly because not visible, in the drawings. For such items not shown, reference should be made to the corresponding item number of another embodiment not preceded by an asterisk. Tooling items not shown may, in general, be similar to the corresponding tooling items shown in FIGS. 1-8. For example, in step 8 of Table 1 indexing tooling block *209 (not shown) may be a tooling block similar to tooling block 09 shown in FIG. 2 and described below. Not all items of each embodiment are shown in the drawings. The drawings of a similar embodiment may show a corresponding item. For example, items 550 and 560 referred to in step 34 of Table 1 are not shown in FIG. 14 but FIGS. 12 and 13 show corresponding items 350 and 360.

The flexure hinge assembly shown in FIGS. 1-8 includes an inner tubular member 00 having a common longitudinal axis 01 and an other tubular member 02 both preferably formed of high strength steel having highly resilient spring characteristics. Although members 00 and 02 are shown axially separated in FIG. 1 to facilitate illustration, they are normally telescoped, i.e., member 00 is accommodated within member 02 in a coaxial and concentric manner about the common axis of symmetry 01. As will be seen from the description further below, the manufacturing method creates flexure hinges in the walls of members 00 and 02 which bend or flex about flexure axes 03 and 05 which flexure axes are orthogonal to the longitudinal, or common, axis 01 and which intersect at a common pivot point 07 on axis 01.

Figure 1:
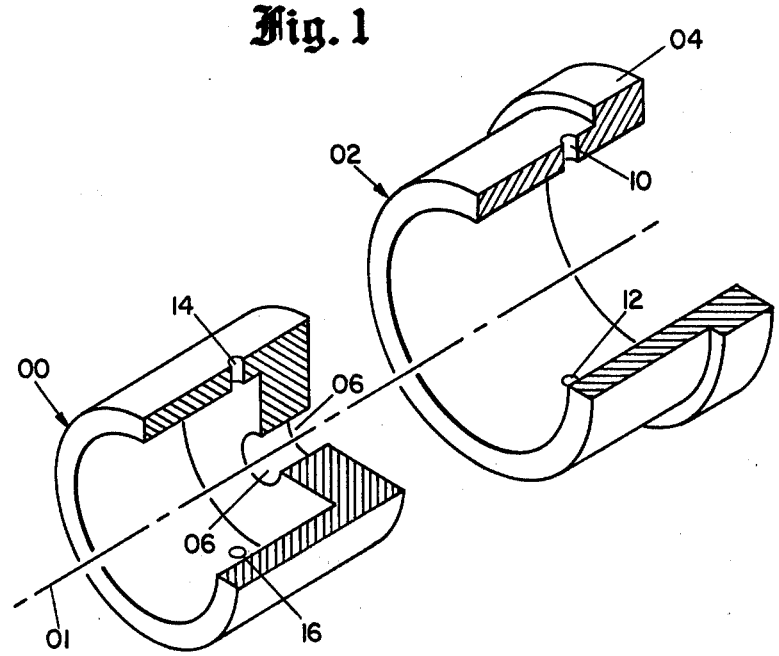
FIG. 1 is an exploded, perspective view, of blanks for the inner and outer tubular members of one embodiment of a flexure hinge assembly in accordance with the invention.

Outer tubular member 02 is a right circular cylinder having a flange 04 at one end. Flange 04 provides a mount for an inertial wheel, i.e., a rotor (not shown in FIG. 1). Member 02 is substantially a right circular cylinder of bar stock ground to create flange 04 as shown in FIG. 1

Inner tubular member 00 is also formed of bar stock. The bar may be drilled or hogged out to form a cup, i.e., a right circular cylinder having one end closed.

When designing a flexure hinge assembly for a universal joint for use as the suspension for a rotor element from a shaft in a free rotor gyroscope, consideration must be given to the location of the center of suspension, i.e., the location of pivot point 07, along axis 01. The general requirement for fabricating such a suspension is satisfied by a moment of inertia of the gimbal element which is equal and opposite to the spring rate of the flexure blades. If the spin axes of a rotor element (not shown) and of a drive shaft (not shown) are not aligned one with the other each gimbal element must vibrate back and forth to accommodate the relative motion. Since a gimbal element has a finite mass and moment of inertia, it must be acted on by torques to produce this motion, and these torques are produced partly by reactions on the drive shaft and partly by reactions on the rotor element. The reaction torques on the rotor element provide a compensating mechanism. Mathematically, these torques of the gimbal elements are identical to a negative in-phase spring rate. They may be adjusted to make the rotor element precess in a cone but in the opposite direction to the precession produced by the bending action of the flexure hinges. Adjustment of the negative spring rates of the gimbals to cancel the torsional positive spring rates at a particular spin speed of the rotor is known as "tuning" the gyroscope. The conditions of tuning a free-rotor gyroscope having a single intermediate gimbal suspended between a rotor and a shaft are described in an article entitled "Dynamically Tuned Free Rotor Gyroscope" published in Control Engineering, June, 1964, pages 67 through 72.

The stiffness of this dynamic negative spring rate is determined by the moments of inertia of the gimbal elements. The general torque expression is given by the stiffness of the negative spring rate:

dynamic spring rate for each gimbal element = $N^2 (C-A-B)$ where N = spin frequency and A and B are gimbal moments of inertia about the flexure axes and C is the moment of inertia of the gimbal moment of inertia about the spin axis and about the flexure axes. The magnitude of the effective spring rate is proportional to the moment of inertia of gimbal element about the spin axis minus the moments of inertia about the two pivot axes. If the gimbal element were infinitely thin, this expression would approach zero, as the negative spring rate is proportional to the height of the gimbal element in the direction of the spin axis. In practice, the positive spring rates of the individual flexure hinges are preferably matched to one another within an accuracy of about five percent, and the effective height of each gimbal element may be adjusted, if necessary, by means of adjustment screws or by removing material from the gimbal elements so that the total spring rate is substantially zero.

For a gyroscope in the free mode (no capturing) a direct, or as it is called, in-phase net spring rate causes nutation of the rotor element (a slow coning motion) which is directly proportional to the extent the rotor axis is offset from the spin axis. For example, a direct spring rate arises if the spin frequency is different from the tuned frequency of the gimbal suspension, i.e., if the suspension is not perfectly tuned. Torque is developed about the same axis as the initial displacement, which in turn causes the rotor to precess about an axis at right angles to the displacement axis. Since there is no energy dissipation in this spring, the rotor axis of spin does not return to the shaft axis of spin but continues to precess in a cone about the shaft axis.

The magnitude of the in-phase spring rate for off-tuning conditions is $$\dot{\theta}/\theta = (\Delta N)/F_m$$

where $\Delta N$ is the difference between the tuned frequency and the actual spin frequency and $F_m$ is a term called the figure of merit. $F_m$ for any given instrument is equal to $HN/K_T$, where H is the angular momentum of the rotor element, N is the frequency of rotation, and $K_T$ is the sum of all the torsional spring rates of the hinge suspension. A net in-phase spring rate due to off-tuning is avoided by adjusting the moments of inertia of the gimbal elements in the manner taught below. The flexure hinge assembly of the invention may be implemented in a gyroscope which is substantially free from error torques arising because of the rectification of angular vibrations occurring at a frequency equal to twice the spin frequency of the rotor element. Ball bearings utilized to support the shaft produce angular vibrations at harmonics of the spin frequency. Unless compensatory adjustments are made, tuned-rotor gyroscopes will rectify such angular vibrations at twice the spin frequency. The effect can be severe, typically of the order of 5°/hr/per arc second amplitude of the vibration at a frequency of twice the spin frequency. Such rectified error torques may be substantially avoided by proper design of the theoretical moments of inertia of the gimbal elements and, if necessary, adjustment of the actual moments of inertia.

To explain this effect more fully, an example is given wherein the flexure hinges along one flexure axis of a gimbal element are relatively stiff compared to hinges along the other flexure axis of the gimbal element. If the gyroscope is subjected to angular vibration, the hinges must bend by an amount equal to the amplitude of the vibration, thus producing a direct spring torque on the rotor element. Normally these spring torques will average to zero over each cycle of vibration, but not in the case of synchronous vibration at twice the spin frequency 2N. In the worst case the positive half-cycles of angular displacement will bend a stiff flexure hinge, while the negative half-cycles will bend a weak, i.e. a less stiff, flexure hinge. The result is a net average torque on the rotor element. For actual flexure hinges this effect can be practically avoided by careful design of the spring rates of the flexure hinges.

However, the negative dynamic spring rate produced by the motion of each gimbal element is highly asymmetrical. To explain this phenomenon more fully, assume that an angular rate is applied about an axis fixed with respect to the housing of the instrument. The torque transmitted to the rotor element at any given instant is a function of the position of the rotor element at that instant. For a single gimbal element it can be seen that the gimbal element is coerced to follow the shaft angular rate when the shaft-attached flexure axis is at right angles to the axis of the input rate, but is not coerced to follow the shaft when it is in line with the axis of the input rate (because of its low torsional stiffness). Essentially, then, the rotor element is alternately torqued with high gyroscopic torques when the input angular rate acts on the drive shaft about the rotor-attached flexure axis of a gimbal element, but it is not torqued with high gyroscopic torques when the input angular rate on the drive shaft acts about the shaft-attached flexure axis of that gimbal element. If a condition can be met such that the high angular rates in one direction occur when there is a strong gyroscopic coupling to the rotor element, but for the high angular rates in the opposite direction the transmitted torques are very weak, then there will be a net rectification in favor of the high-coupling direction. Such a condition does exist for angular vibration inputs at twice the spin frequency and only at this frequency. Analysis has shown, however, that this rectification effect is canceled by the torques applied to the rotor element by a properly matched second gimbal element attached at right angles to the first, and has its moment of inertia matched to effectively cancel the torque vectors of the two gimbal elements.

The flexure hinge assembly of the invention may be fabricated in embodiments having two independent gimbal elements, with gimbal inertias designed to achieve cancellation of the spring rates and cancellation of torques due to vibrations about case-fixed input axes at twice the spin speed. For example, the gimbal elements will rectify 2N vibration, but the rectification torques will be equal and opposite, provided that the gimbal elements are carefully matched for this characteristic. Matching may be accomplished with balance weights or material may be removed from a gimbal element. U.S. Pat. No. 3,678,7654 more completely describes the equations of motion of such a gyroscope, the tuning conditions, and the conditions for substantial suppression of errors caused by torques applied at a frequency of twice the rotor rotational rate, i.e., the spin frequency.

The application of these principles to the embodiments described herein will be better appreciated after reading the following description of the division of members 00 and 02 into a driving element, gimbal element and a driven element, as shown in the embodiments of FIGS. 1-8 and FIGS. 9-13. In applying these principles, the location of pivot point 07 along axis 01 is calculated to make the moment of inertia of the finally remaining portions of inner and outer tubular members 00 and 02 in one axial direction from pivot point 07 equal in magnitude to the moment of inertia of the finally remaining portions of inner and outer tubular membrs 00 and 02 in the other axial direction from pivot point 07. The mass of inner and outer tubular members 00 and 02 used for this calculation does not include material removed for the apertures or the slots which are described below as dividing members 00 and 02 into a driving element, a gimbal element and a driven element or material of members 00 and 02 radially disposed inwardly from flange 04. In all of the embodiments shown herein, the gimbal inertia cancels the spring rate of the flexure blades. Some of the embodiments have gimbal elements connected to cancel rectified torques arising due to angular vibrations at twice the rotor rotational frequency, i.e., spin frequency, or speed.

In the first step of manufacturing the embodiment shown in FIGS. 1-8 the outer diameter of inner tubular member 00 is ground to a predetermined length. Next, aperture 06 is drilled in the closed end of inner tubular member 00. Aperture 06 is of a size to fit a drive shaft (not shown). The inner diameter of outer tubular member 02 is lapped to obtain a fit between members 00 and 02 known to machinists as a "push fit". The fit between members 00 and 02 must be such that they can be separated one from the other. Inner and outer tubular members 00 and 02 are telescoped one within the other in a coaxial position and then ground to the same length.

An indexing block 09 may be used to facilitate fabrication of a flexure hinge assembly from the coaxially postioned inner and outer tubular members 00 and 02. Indexing block 09 is adapted to be rotated 360° in 90° steps about axes 01, and rotated 360° in 90° steps about axis 03, i.e. 360° in a horizontal plane. Axes 01, 03 and 05 are all shown in FIG. 2. Indexing block 09 can be precisely positioned at intervals of 90° about axis 01 and precisely positioned at intervals of 90° about axis 03. The operation of indexing block 09 is described in terms of axis 03 only for convenience. Axes 01, 03 and 05 are fixed axes shown for illustrating the method of fabrication and do not rotate as members 00 and 02 are rotated. Alternatively, tooling rotatable about the circumference of members 00 and 02 could be utilized.

Radial indexing holes 10 and 12 and radial indexing holes 14 and 16 are drilled along colineal diameters of outer tubular member 02 and inner tubular member 00, respectively. Conventional machining techniques are utilized to drill holes 10 and 14 together and holes 12 and 16 together. These radial holes are utilized for maintaining precise alignment between members 00 and 02 during the subsequent steps of fabrication of the flexure hinge assembly as described below.

Figure 2:
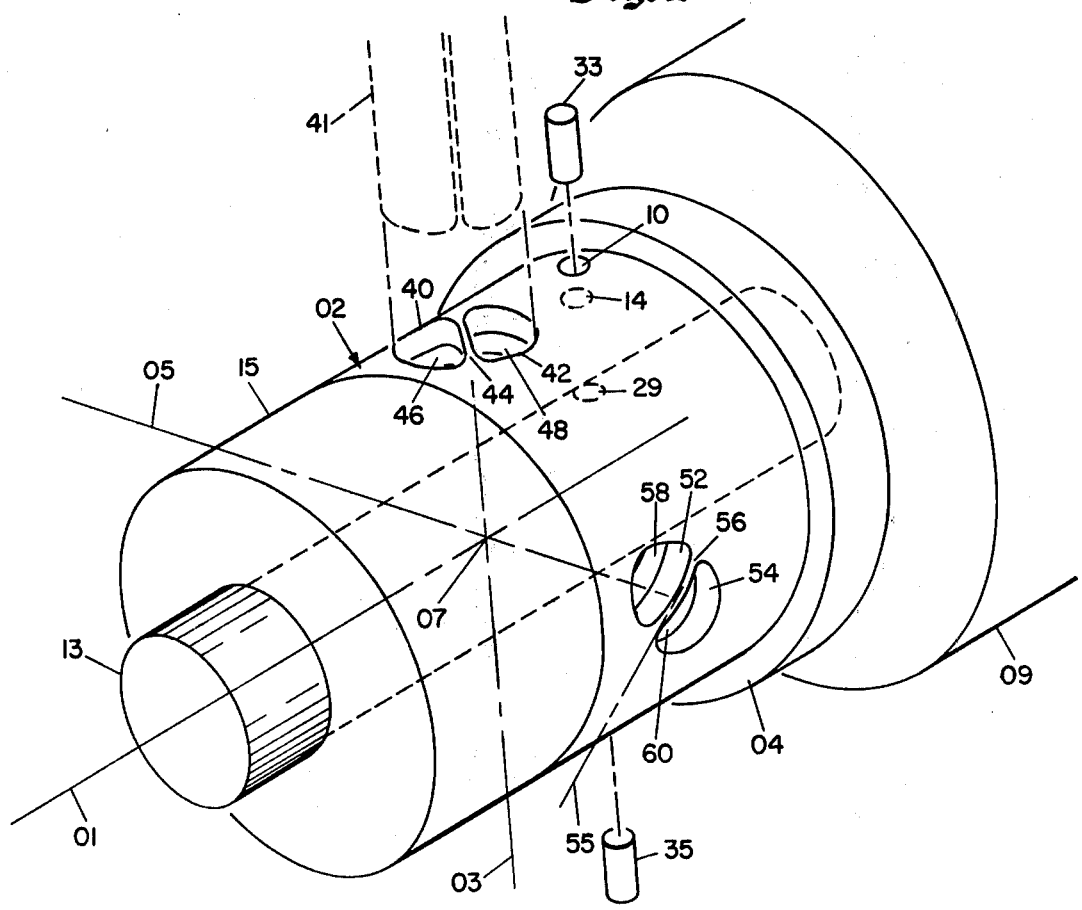
FIG. 2 is a perspective view of the inner and outer tubular members when assembled in a first relative angular position of coaxial alignment.

A spud 13 and a washer 15, shown in FIG. 2, are utilized to mount the coaxial members 00 and 02 onto indexing block 09. Washer 15 has substantially, though not necessarily, precisely the same diameter as the outer diameter of outer tubular member 02. Spud 13 clamps members 00 and 02 between washer 15 and indexing block 09. Spud 13 has radially extending indexing holes 29 and 31. Indexing hole 31 is not visible in FIGS. 1-8. Spud 13 is designed so that the center lines of holes 10, 12, 14, 16, 29 and 31 coincide to lie upon a common line when members 00 and 02 are mounted to indexing block 09.

Indexing pins 33 and 35 are utilized to maintain alignment between members 00 and 02 and the indexing block 09 during fabrication. Pin 33 is inserted into holes 10 and 14 and pin 35 into holes 12 and 16. Members 00 and 02 are then mounted in coaxial position on indexing block 09 using spud 13 and washer 15. Members 00 and 02 are then rotated about their common axis 01 until the indexing pins 33 and 35 can be pushed into holes 29 and 31, respectively.

Each flexure blade defines and thus has a plane of flexure which includes the flexure axis 03 or 05 about which the flexure blade bends and also includes a longitudinal axis of the flexure hinge which is perpendicular to the flexure axis. The axis of symmetry is also known as the longitudinal axis of a flexure blade. Flexure plane 55 is shown in FIG. 2 as an example of the flexure plane of each flexure hinge.

Referring now particularly to FIG. 2, apertures 40 and 42 are shown as they are formed by means of a tool 41. Tool 41 is an electrical discharge machining (EDM) tool. Electrical discharge machining is a known process for forming flexure blades. Patents discussing EDM techniques are mentioned further below in the section of this description entitled "Discussion of the Prior Art", see particularly U.S. Pat. No. 3,585,866 and a handbook of machining procedures entitled "Electrical Machining, Spark-Erosion Machines, Technology Generators" which is available from the Charmilles Engineering Works Ltd., Geneva, Switzerland. Electrical discharge machining is described in a book entitled "Electrical Discharge Machining of the 1970's" by Leland J. Quackenbush and William N. Lawrence. The book is available from the Industrial Development Division Institute of Science and Technology, The University of Michigan, 2200 North Campus Boulevard, Ann Arbor, Michigan 48105, U.S.A.

A Charmilles D10 electrical discharge machine may be utilized with electrodes especially designed to make cuts creating apertures and slots in tubular members 00 and 02.

Referring now to FIGS. 2-8 each radially inwardly occurring plunge of EDM tool 41 creates a pair of apertures 40 and 42 and 54 and 58 which are separated by a thin flexure blade 44 and 56 in the cylindrical wall of the outer tubular member 02 and inner tubular member 00, respectively, with the flexure blades formed through both tubular members by a single plunge being created simultaneously and mutually aligned, i.e., coplanar. According to the steps of the method of the invention thus far explained, a precise flexure hinge assembly is fabricated by mounting a pair of tubular members in a coaxial, telescoped position, and forming pairs of coplanar, radially adjacent flexure blades in the inner and outer tubular members. As will be discussed further below, these steps are followed by cutting slots into the tubular members which slots interconnect pairs of apertures, followed by rotating the inner and outer tubular members with respect to one another and securing portions of one to portions of the other in the rotated position, thereby to form a plurality of flexure hinges, each flexure hinge comprising a pair of mutually orthogonal flexure blades, one flexure blade in the outer tubular member and one flexure blade in the inner tubular member on a common flexure axis. The pattern of flexure blades is selected to permit firstly forming a pair of radially adjacent flexure blades at intervals of 90° about the circumference of the tubular members, followed by rotating the tubular members with respect to one another through a predetermined angle, thereby to create four flexure hinges of which each have a pair of mutually orthogonal flexure blades.

From the illustration in FIG. 2 it can be seen that each flexure blade, such as the visible flexure blades 44 and 56, is formed by a very thin remainder of the cylindrical wall of a tubular member, as it remains between two apertures. A flexure blade is then a substantially thin almost flat blade two-dimensional element defining a plane 55 which extends through it and separating the two apertures. This plane is referred to herein as the flexure plane for each flexure blade. Flexure plane 55 is shown in FIG. 2 as an example of a flexure plane.

Orthogonality of the flexure blades of each flexure hinge results in the effect that the flexure hinge assembly will have the desired, substantially equal translational stiffness in the radial and axial directions. This characteristic is known as isoelasticity. Neither flexure plane of the flexure blades of a flexure hinge need be parallel or perpendicular to the longitudinal spin axis of the flexure hinge assembly. In most of the embodiments shown herein, the two flexure planes of each flexure hinge form angles of 45° with the common, or spin axis but in opposite directions. Experimentation with a particular flexure hinge assembly will indicate any deviation from such a 45°—45° pattern needed to achieve isoelasticity. Of course a 0°-90° pattern may also be used, as more particularly discussed further below.

The method of fabrication of flexure hinge assemblies in accordance with the invention is applicable to numerous configurations of apertures and slots, as will be seen from the ensuing discussion of other embodiments. All of the embodiments of the invention include the provision of pairs of coplanar, radially adjacent flexure blades in inner and outer tubular members 00 and 02, followed by rotating members 00 and 02 and securing parts of one to parts of the other to create flexure hinges, as discussed above. According to the general method of fabrication applicable to all embodiments and summarized in Table 1, one pair of coplanar, radially adjacent flexure blades is formed in tubular members 00 and 02 and then members 00 and 02 are rotated into the next position in which the next pair of apertures is formed. In a preferred variation of the general method, two pairs of diametrically opposite flexure blades are fabricated before rotating the two members into the next position. This variation of the general method of fabrication is discussed below and summarized in Table 2. It is not applicable to all embodiments.

Continuing now with a discussion of the general method of fabrication applicable to all embodiments, it may be seen from FIGS. 2–8 that one plunge of tool 41 will create apertures 40 and 42 in outer tubular member 02 and apertures 46 and 48 in inner tubular member 00. The portion of member 02 between apertures 40 and 42 constitutes flexure blade 44. As shown in FIG. 6 flexure blade 50 is created just below flexure blade 44 and between apertures 46 and 48. The formation of apertures and slots is herein after described as being made by a single plunge of an EDM tool in one position. It is to be understood that the term "a single pass" also includes a pass with roughly shaped tool and one or more finishing passes of a precisely dimensioned tool.

Indexing block 09 is then rotated by 90° about axis 01 and secured in the new position. The next plunge of tool 41 forms apertures 52 and 54 in outer tubular member 02 and apertures 58 and 60 in inner tubular member 00, creating flexure blades 56 and 62 respectively.

Indexing block is now rotated 90° clockwise both in a horizontal plane about axis 03, and rotated 90° about axis 01. In the embodiment of FIGS. 1–8 flexure hinges will ultimately be formed by rotating inner and outer members 180° with respect to one another. If tool 41 were again plunged through members 00 and 02 without a rotation of 90° about axis 03, the forthcoming rotation of members 00 and 02 with respect to one another would not result in mutually orthogonally oriented, radially adjacent flexure blades. Rather, the radially adjacent flexure blades after such rotation would still be coplanar, i.e., the flexure planes of the flexure blades would still be parallel, which means they would coincide one with the other.

The next plunge of tool 41 forms apertures 64 and 66 in outer tubular member 02 and apertures 70 and 72 in inner tubular member 00, thus creating flexure blades 68 and 74 respectively.

Indexing block 09 is rotated 90° clockwise about axis 01. No rotation of indexing block 09 about axis 03 is made in this position. Tool 41 is plunged through members 00 and 02 to form apertures 76 and 78 in member 02, as well as apertures 82 and 84 in member 00, thus creating flexure blades 80 and 86 respectively.

The indexing block is next rotated 90° clockwise about axis 01 and 90° counterclockwise about vertical axis 03, to return the block to its initial position.

Figure 3:
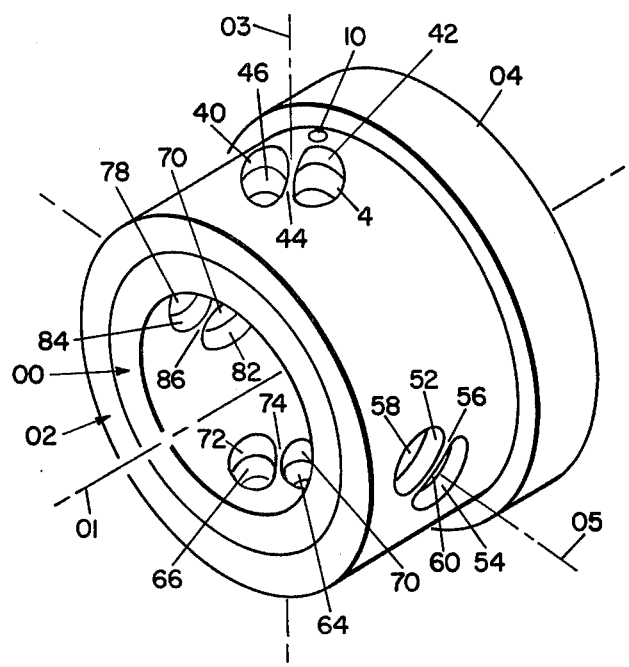
FIG. 3 is a perspective view of the inner and outer tubular members of FIG. 2 when having been machined to contain completed radially aligned pairs of apertures and pairs of radially adjacent flexure blades having coplanar flexure planes.

In order to summarize the steps in which the sixteen apertures are produced, it can be seen that every group of two, radially adjacent pairs of apertures are produced in a single pass of tool 41. With the orientation of tool 41 as shown in FIG. 2, the two pairs of apertures 40, 42 in member 02 and apertures 46, 48 in member 00 are produced as seen in FIGS. 2 and 3. Upon the first 90° rotation about axis 01, the second two pairs of apertures 52, 54 and 58, 60 are formed. For the production of the next two pairs of apertures 64, 66 and 70, 72 which are not visible in FIG. 2 but shown, for example, in FIG. 3, the assembly will again be rotated by 90° about axis 01, and the same statement again applies for the fourth and last two pairs of apertures 76, 78 and 82, 84, visible in FIGS. 2 and 3. As also illustrated in FIG. 3 and explained in more detail below, for the two last-produced pairs of apertures which are seen inside of the assembly as viewed in FIG. 3, for purposes of this embodiment, it would be necessary that the tool 41 be rotated about its own axis, coinciding with axis 03 in FIG. 2, in order to leave flexure blades, such as blades 74 and 86 in the inner tubular member 00, between the apertures which flexure blades are oriented at 90° with respect to the flexure blades between the two first-produced pairs of apertures. Since the tool 41 is fixed in the electrical discharge machine, it was found that it is more practical to proceed as set forth above, namely that the assembly of the two tubular members 00 and 02 be rotated about the axis 03, and this has, of course, the same effect as if such rotation would not occur, but the tool 41 had been rotated. The different orientation of the apertures and therewith of the flexure blades between the apertures, when produced in the first, second, third and fourth areas 90° apart, and formed in that sequence, which has been selected for the illustration and description above, has the purpose already mentioned above, namely that, upon termination of the machining process, when the two tubular members 00 and 02 have been rotated one with respect to the other by 180°, those flexure blades which thereby become radially adjacent one to the other will form the 90° angles required for the conditions of equal torsional stiffness to create the required isoelasticity.

In the immediately following steps, parallel slots will be formed in the walls of the inner and outer tubular members 00 and 02. For embodiments where slots parallel to the longitudinal common axis 01 are radially in alignment, a slot may be formed in both outer and inner tubular members sequentially, i.e., by a single pass of the tool. Where slots are not in radial alignment, the inner and outer tubular members must be separated and the slots made separately in each member. Some of the embodiments have slots made separately in each member. Some of the embodiments have slots parallel to axis 01 which include not only radially adjacent, aligned slots but two pairs of slots on opposite sides of members 00 and 02 which are in alignment. Such pairs of juxtaposed, aligned slots may be made by a variation to the general method of fabrication described below and summarized in Table 2.

Figure 4:
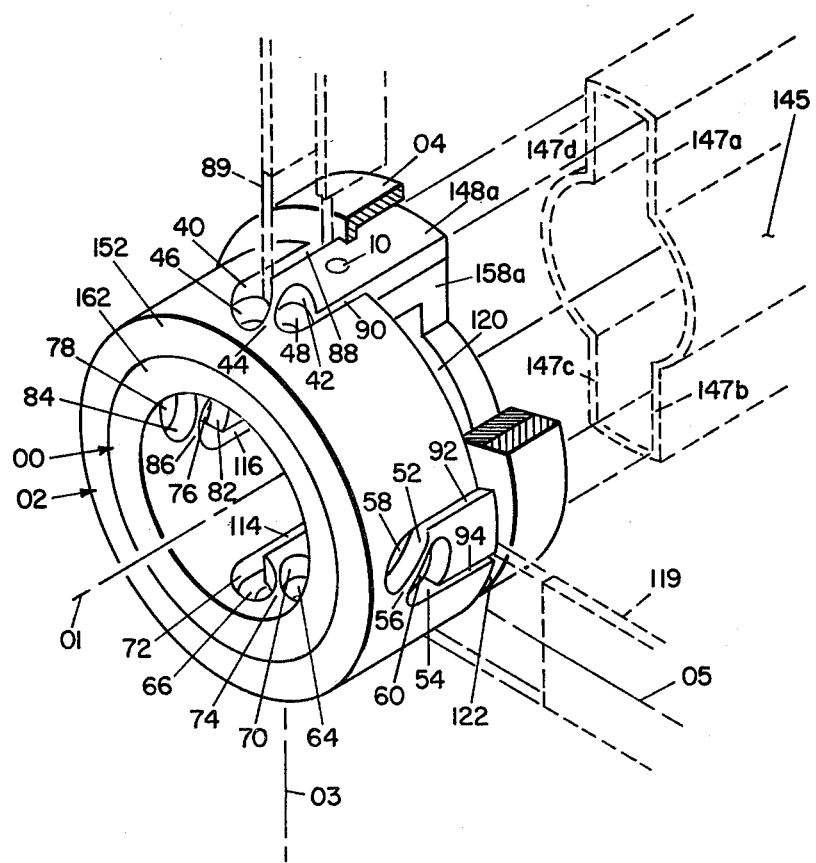
FIG. 4 is a perspective view of the inner and outer tubular members of FIG. 3, illustrating an example of tooling used to form the slots therein.

Returning now to a description of the general method of fabrication, slots parallel to axis 01 are formed in inner and outer tubular members 00 and 02 without removing members 00 and 02 from their coaxial position on spud 13. Tool 41 is removed from the electrical discharge machine and tool 89 is substituted. Tool 89 is another EDM tool which may be a single tool as shown in FIG. 4. Tool 89 is shown positioned to form slot 88. Tool 89 may then be moved along axis 05 into the correct position to form slot 90. Tool 89 may also be a double-bladed tool, as shown, which would simultaneously form slots 88 and 90. The following description assumes the use of a double-bladed tool.

The first plunge of such double-bladed tool 89 forms slots 88 and 90 in outer tubular member 02 and slots 104 and 106 in inner tubular member 00. Indexing 09 is then rotated 90° clockwise about axis 01. The next plunge of tool 89 forms slots 92 and 94 in member 02 and slots 108 and 110 in member 00.

Indexing block 09 is again rotated 90° clockwise about axis 01. The next plunge of tool 89 forms slots 96 and 98 in member 02 and slots 112 and 114 in member 00.

Indexing block 09 is again rotated 90° about axis 01. The final plunge of tool 89 forms slots 100 and 102 in member 02 and slots 116 and 118 in member 00. The indexing block may then be rotated 90° clockwise to return members 00 and 02 into their original position.

Reference is made to the tool 119 shown in FIG. 4. Tool 119 is another EDM tool used to form slots in the walls of members 02 and 00. It will be seen from the orientation of tool 119 with respect to members 00 and 02 that the plunge of tool 119 will create slots in members 00 and 02 which are generally orthogonal to the direction of the common axis 01. In FIG. 4, tool 119 is shown plunging in a direction orthogonal to axis 01 and to the direction of the plunge of tool 89 and tool 41. The direction of the plunge of tools 41 and 89 has been illustrated as the vertical direction. In practice, tool 119 would be substituted for tool 89 and would thus also move along a vertical line. The following description resumes with apertures 40 and 42 and slots 88 and 90 being uppermost and assumes that tool 119 is substituted in the position of tool 89 rather than in the position it is shown.

The first plunge of tool 119 forms slots 120 and 128 in members 02 and 00 respectively. Slot 120 connects with slot 90 and slot 92. Slot 128 connects with slot 106 and slot 108. Thus there is a continuous slot between apertures 42 and 52 and apertures 48 and 58.

Indexing block 09 is rotated 90° clockwise about axis 01. The next plunge of tool 119 form slots 122 and 130 in members 02 and 00 respectively. Slots 94, 122 and 96 connect apertures 54 and 64. Slots 110, 130 and 112 connect apertures 60 and 70. Not all slots are shown in FIGS. 4–8. Corresponding numerals are used in other embodiments described further below. They may be referred to as an aid to understanding the interconnection of the slots, see particularly FIG. 10b and FIG. 10c. It will be recalled that corresponding items in the various embodiments are numbered at intervals of 200.

Indexing block 09 is again rotated 90° clockwise about axis 01. The next plunge of tool 119 forms slots 124 and 132 in tubular members 02 and 00 respectively.

Indexing block 09 is then rotated clockwise about axis 01 through an angle of 90° to the 270° position. The next plunge of tool 119 forms slots 126 and 134 in tubular members 02 and 00.

After producing all apertures, axial slots and peripheral slots, as described, tubular members 00 and 02 are removed from indexing block 09 by disengaging index pins 33 and 35 from index holes 29 and 31 respectively. However, index pin 33 and 35 are not entirely removed and continue to pin inner and outer tubular members 00 and 02 in a precise alignment with respect to one another. Spud 13 is removed from indexing block 09 thereby freeing the assembly of the inner and outer tubular members 00 and 02.

Using conventional machining techniques, tubular members 00 and 02 may be mounted to facilitate a vertical plunge of an EDM tool along longitudinal axis 01. Reference is made to FIG. 4 wherein a fourth EDM tool 145 is shown. EDM tool 145 is shaped to cut longitudinal slots in tubular memnbers 00 and 02. Slots 136, 138, 140 and 142 may be best understood by reference to FIG. 5. Slots 136, 138, 140, and 142 complete the partition of tubular members 00 and 02 into a driving element, a gimbal element, and a driven element.

Tool 145 is plunged into members 00 and 02 along axis 01. Tool 145 is shown in a horizontal position in FIG. 4 for convenience of illustration. The plunge of tool 145 would normally be in a vertical direction, as discussed above. The plunge of tool 145 creates outer driving elements 148a and 148b, outer gimbal element 152, outer driven elements 154a and 154b, inner driving elements 158a and 158b, hub 160 and inner gimbal element 162 and inner driven elements 164a and 164b. use of the term "outer" refers to outer tubular member 02. Use of the term "inner" refers to inner tubular member 00.

Tool 145 is shown as a single tool forming a unit. In practice, this tool may be replaced by several different EDM tools each of which is designed to cut a different portion of the entire cut made by tool 145 as illustrated. For example, one tool could make the circular portions of the cut and a second tool could make the U-shaped portion at each end of the cut. Other divisions of the outline of tool 145 are of course possible.

Once all steps involving electrical discharge machining are completed, one of the two tubular elements 00 and 02 is rotated about 180° with respect to the other and held in this position with indexing pins.

Next, each portion of each element in the inner tubular member is bonded to portions of the corresponding portion of the same element in the outer tubular member. Outer driving element portion 148a is bonded to inner driving element portion 158a. Outer driving element portion 148a is bonded to inner driving element portion 158b. There is now a rigid connection between outer driving elements 158a and 158b and a drive shaft (not shown) which would mount in aperture 06. This rigid connection is through inner driving elements 148a and 148b and hub 160.

Outer gimbal element 152 is bonded to inner gimbal element 162. It will be recalled that the tubular members 00 and 02 had a "push fit" telescoped coaxial position one with respect to the other. Bonding of the inner and outer gimbal elements 152 and 162 respectively creates a single gimbal element which will exhibit dynamic characteristics in response to rotor disturbances as taught in U.S. Pat. No. 3,678,764.

Outer driven elements 154a and 154b are bonded to inner driven elements 164a and 164b respectively. Thus, there is a rigid connection between inner driven elements 164a and 164b and a rotor (not shown in FIGS. 1–8) through flange 04 and outer driven elements 154a and 154b.

The indexing pins are then removed from the completed flexure hinge assembly, but may be left inserted to maintain a uniform mass distribution.

DESCRIPTION OF METHODS OF MAKING OTHER EMBODIMENTS OF THE INVENTION

There follows in this section a description of other embodiments of the invention as shown in FIGS. 9–13; FIG. 14; FIGS. 15–16; FIG. 17; and FIGS. 18–23. The general method of fabricating these embodiments is also described only insofar as the method differs from the above description of the method of fabricating the embodiment shown in FIGS. 1–8. In other words, this section does not contain a complete description of the method of making these embodiments. Tables 1 and 2 include all the basic method steps for fabricating these embodiments. This section should be read in conjunction with Tables 1 and 2.

Figure 9:
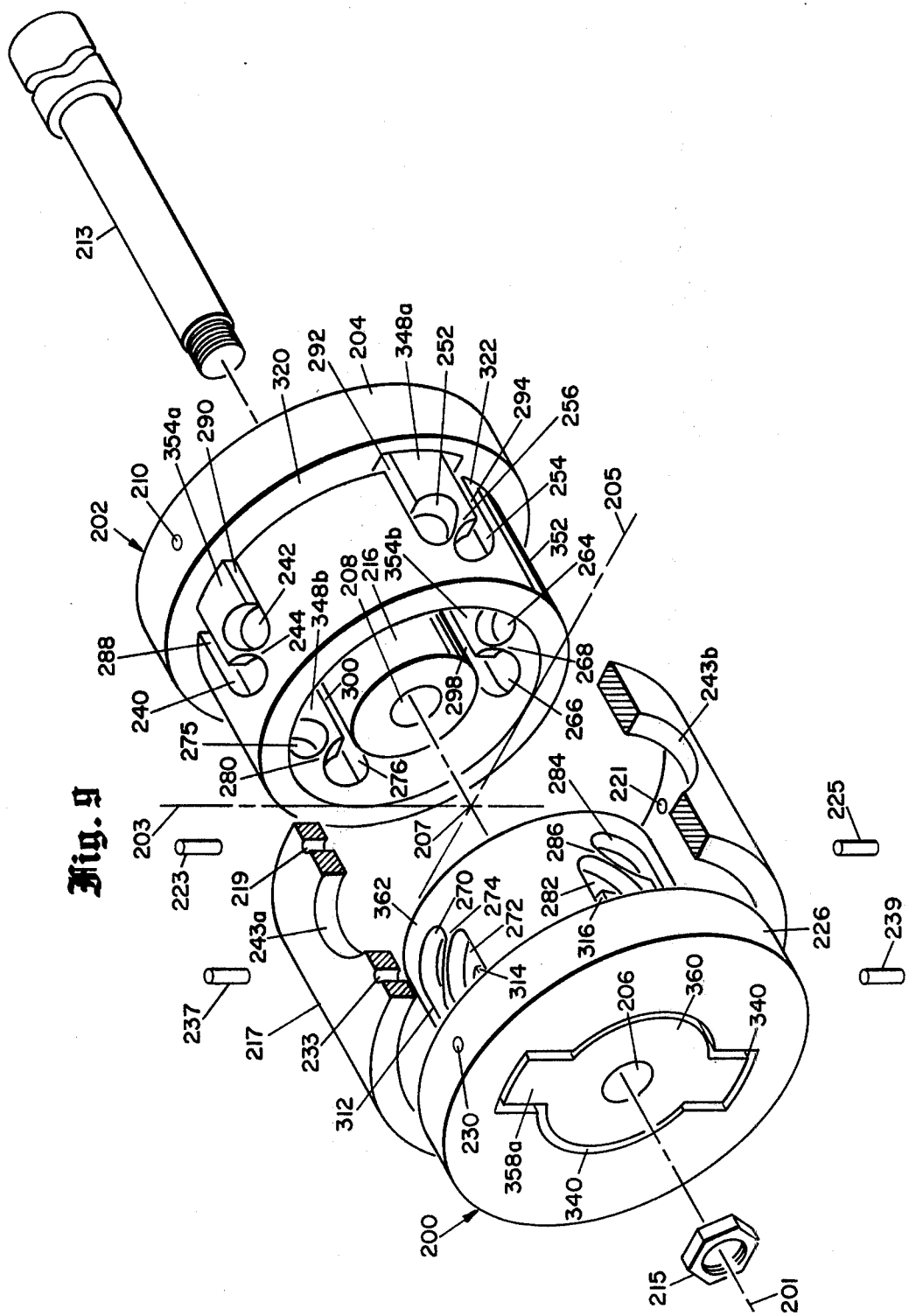
FIG. 9 is an exploded, perspective view of a second embodiment of the invention having two intermediate gimbal elements adapted to vibrate independently of one another.

Referring now to FIGS. 9–13, there is shown therein inner tubular member 200 and outher tubular member 202. For convenience of illustration, FIG. 9 shows members 200 and 202 in an exploded view after the rotation forming flexure hinges. Members 200 and 202 have a colineal longitudinal, i.e., common, axis 201. In this embodiment of the invention, a driving element, a gimbal element and a driven element will be formed from each of members 200 and 202. In other words, this embodiment will have two intermediate gimbal elements capable of moving independently through small angles. The theory and dynamic characteristics of a flexure hinge assembly having two gimbal elements is described in U.S. Pat. No. 3,678,764.

In this embodiment, flexure hinges which interconnect a driving element to a gimbal element and a gimbal element to a driven element are formed in the manner described above for the embodiment of FIGS. 1-8. The flexure hinges are each comprised of a pair of flexure blades having a common flexure axis. Orthogonal axes 203 and 205 are identified as the flexure axes which are perpendicular to axis 201.

Each of the members 200 and 202 comprises a right circular cylinder having a closed end and a flange at the closed end. Outer tubular member 202 includes flange 204. The closed end of member 202 has an aperture 208 formed therein for receiving a drive shaft (not shown). Flange 204 has two diagonally opposite radial indexing holes 210 and 212 drilled therein. A coaxial cylindrical member 216 may be a part of outer tubular member 202 or it may be a separate member. In order to perform the general method of fabrication of the embodiment of FIGS. 9-13 and FIG. 14 it is not necessary that cylindrical member 216 be separate from the portions of outer tubular member 202 descrived above. Cylindrical member 216 is a spacer which limits the nesting of member 202 in member 200. More particularly, cylindrical member 216 spaces the open end of each tubular member from the flange of the outer tubular member when the tubular members are in their normal, nested position, see FIG. 11. Members 200 and 202 are mounted on spud 213, FIG. 9, in a nested position. Nut 215 holds members 200 and 202 in a nested position on spud 213 with cylindrical member 216 abutting the inner, closed end of member 200. Tooling sleeve 217 is a sleeve used to maintain a precise angular alignment of members 200 and 202 with respect to each other. Tooling sleeve 217 has radial indexing holes 219 and 221 which have center lines on the same diameter as holes 210 and 212. Indexing pins 223 and 225 are inserted through radial indexing holes 219 and 210 and through radial indexing holes 221 and 212, respectively.

Inner tubular member 200 has a flange 226 similar to flange 204 on outer tubular member 202. Flange 226 has two radial indexing holes 228 and 230 drilled therein. Inner tubular member 200 has an aperture 206 for receiving a drive shaft (not shown) which also passes through aperture 208 in outer tubular member 202. Sleeve 217 has two radial indexing holes 233 and 235 with center lines on the same diameter as radial indexing holes 228 and 230. Indexing pins 237 and 239 are inserted in radial indexing holes 233 and 228 and 235 and 230. FIG. 9 illustrates members 200 and 202 after member 200 has been rotated 180° with respect to member 202 to create pairs of mutually crossing radially adjacent flexure blades, similar to those of the embodiment of FIGS. 1-8, the method for producing the flexure blade 35 being described in detail below.

In the embodiment shown in FIGS. 9-13 the inner diameter of outer tubular member 202 is larger than the outer diameter of inner tubular member 200. In other words there is no "push fit" as described above with respect to the embodiment of FIGS. 1-8. Also, the inner diameter of inner tubular member 200 is larger than the outer diameter of the cylindrical member 216. Thus, each of the two gimbal elements to be formed at the open end of members 200 and 202, respectively, will be free to move through small angles without coming into contact with the other gimbal element.

Of course, the radial indexing holes in flanges 204 and 226 must be drilled separately.

Pairs of adjacent apertures are formed in the walls of members 200 and 202 in the manner described with respect to the embodiment of FIGS. 1-8.

FIGS. 10a, 10b, 10c and 10d illustrate the basic method steps in fabricating this embodiment. FIG. 10a shows in a developed, two dimensional view, the entire periphery of the nested tubular members 200 and 202 at a stage where apertures have been formed. It will be noted that the center line representing the flexure plane of the flexure blade in the outer tubular member 202, namely flexure blades 280 and 244 are parallel and the center lines of flexure blades 255 and 268 are also parallel. Moreover, the center lines, i.e., flexure planes of flexure blades 280 and 244 are oriented orthogonally with respect to the center lines, i.e., flexure planes, of flexure blades 256 and 268. Of course, under each one of these four flexure blades there is a radially adjacent flexure blade in the inner tubular member 200 having surfaces in the walls of the apertures that are coplanar with the radially adjacent flexure blade in the outer tubular member. As FIGS. 10a through d are developed views, the flexure axes 203 and 205 appear twice in each of these figures.

FIGS. 10b and 10c show tubular members 200 and 202 in an exploded view at a stage after the slots have been made. Note that the slots have been formed but member 200 has not been rotated with respect to member 202. Even though each of the pair of apertures in the inner tubular member 200 is in alignment with a pair of apertures in the outer tubular member 202, the slots are not in alignment as can also be seen from FIG. 9 and therefore the slots of this embodiment may not be formed with members 200 and 202 in a coaxial common nested position.

FIG. 10d should be viewed in conjunction with FIG. 10b. FIG. 10d shows the inner tubular member 200 as seen in FIG. 11c, but rotated through an angle of 180° with respect to outer tubular member 202 which remains in the position shown in FIG. 10b. This rotation is schematically indicated by the changing locations of the vertical directed lines labeled 0°, 90°, 180° and 270°. From a super imposition of FIGS. 10b and 10c, which would represent the concentrical assembly as shown in FIG. 10, it may be seen that each pair of radially adjacent flexure blades, namely flexure blade pairs 244 and 274, 256 and 286, 268 and 250, 280 and 262, are mutually orthogonally oriented and therefore satisfy the requirement for isoelasticity.

The axial and peripheral slots in members 200 and 202 may be formed using conventional machining techniques. The location of the slot does not, of course, affect the accuracy with which axes 203 and 205 intersect at the desired common pivot point 207 on axis 201 of FIG. 9. The slots may be formed utilizing indexing block 209 and a spud and spacer similar to spud 13 and spacer 15 shown in FIG. 2.

In performing steps 17 through 32 as set forth in Table 2 and continued in Table 1, the slots would first be formed in one tubular member and then in the other tubular member. In other words, steps 17 through 32 would be performed separately for inner tubular member 200 and for outer tubular member 202.

A tool 345a (not shown) similar to tool 145 would be used to form slot 336, FIGS. 11 and 12. Slot 336 divides the outer tubular member into outer driving elements 348a and 348b; hub 350; outer gimbal element 352; and outer driven element 354a and 354b. That is, slot 336 is the last cut separating an outer driving element from a gimbal element and from a driven element, except for flexure blades 244, 250, 256, etc. Outer driving elements 348a and 348b are portions of outer tubular member 202 which connect flexure blades 256 and 280 to hub 350. Hub 350 includes aperture 208 for receiving a drive shaft. Outer driven elements 354a and 354b connect flexure blades 244 and 268 to flange 204. Thus it may be seen from FIGS. 10b and 10d that flexure blades 244 and 268 are rotor-attached and flexure blades 256 and 280 are shaft-attached, i.e., they connect to the drive shaft (not shown) and to the rotor (not shown) respectively.

Similarly, a tool 345b (not shown) similar in shape to tool 145 may be used to form slot 340. Slot 340, FIG. 13, partitions inner tubular member 200 into inner driving elements 358a and 358b; hub 360; inner gimbal element 362; and inner driven elements 364a and 364b. From FIG. 10d it may be seen that flexure blades 274 and 250 are shaft-attached and flexure blades 262 and 286 are rotor-attached flexure blades.

Thus the embodiment shown in FIGS. 9-13 has two independent intermediate gimbal elements, each having two shaft-attached flexure blades and two rotor-attached flexure blades oriented orthogonally to the first two flexure blades. The two gimbal elements of this embodiment will cancel rectification torques caused by vibrations of the drive shaft occurring at twice the spin speed of the drive shaft in the manner taught and claimed in U.S. Pat. No. 3,678,764.

Thus the fabrication of the embodiment of FIGS. 9-13 is complete. Tubular members 200 and 202 may be bonded to sleeve 217 to maintain their axial and radial orientation in the precise alignment in which they were fabricated.

Consider now the embodiment of the invention shown in FIG. 14. The embodiment of FIG. 14 is identical to the embodiment shown in FIGS. 9-13, except that it is not adapted to cancel rectification torques caused by augular vibrations at twice the spin frequency in the manner taught and claimed in U.S. Pat. No. 3,678,674. Because of the absence of this feature, the embodiment of FIGS. 9-13 with two gimbal elements is clearly preferable over the embodiment of FIG. 14. The embodiment of FIG. 14 is one illustration of the breadth of the novel method of fabricating flexure hinge assemblies.

Note that FIGS. 14b and 14c show a pattern of apertures forming flexure blades in inner tubular member 400 and outer tubular member 402 which is different from that of FIGS. 10b and 10c. The pattern of center lines of the flexure blades of FIGS. 14b and 14c alternates in direction every 90°.

It may be seen from FIGS. 14b and 14d that the shaft-attached flexure blades of both members 400 and 402 are circumferentially aligned with one another and the rotor-attached flexure blades are aligned with one another. That is, rotor-attached flexure blades 444 and 462 are circumferentially aligned, rotor-attached flexure blades 468 and 486 are circumferentially aligned, shaft-attached flexure blades 480 and 450 are circumferentially aligned and shaft-attached flexure blades 456 and 474 are circumferentially aligned. Thus it is seen in FIGS. 10b and 10d that one rotor-attached flexure blade and one shaft-attached flexure blade is circumferentially positioned at each 90° interval.

In FIGS. 15-16 there is shown an embodiment of the invention wherein the inner tubular member 600 and the outer tubular member 602 each comprise a right circular cylinder. The embodiment of FIGS. 15 and 16 is a flexure hinge assembly having two independent intermediate gimbal elements. The inner diameter of outer tubular member 602 is greater than the outer diameter of inner tubular member 600 to permit independent motion of the two gimbal elements. End flanges 604a and 604b on the inner tubular member 600 serve as spacers between tubular members 600 and 602 for maintaining these members in coaxial concentric position.

Figure 16A:
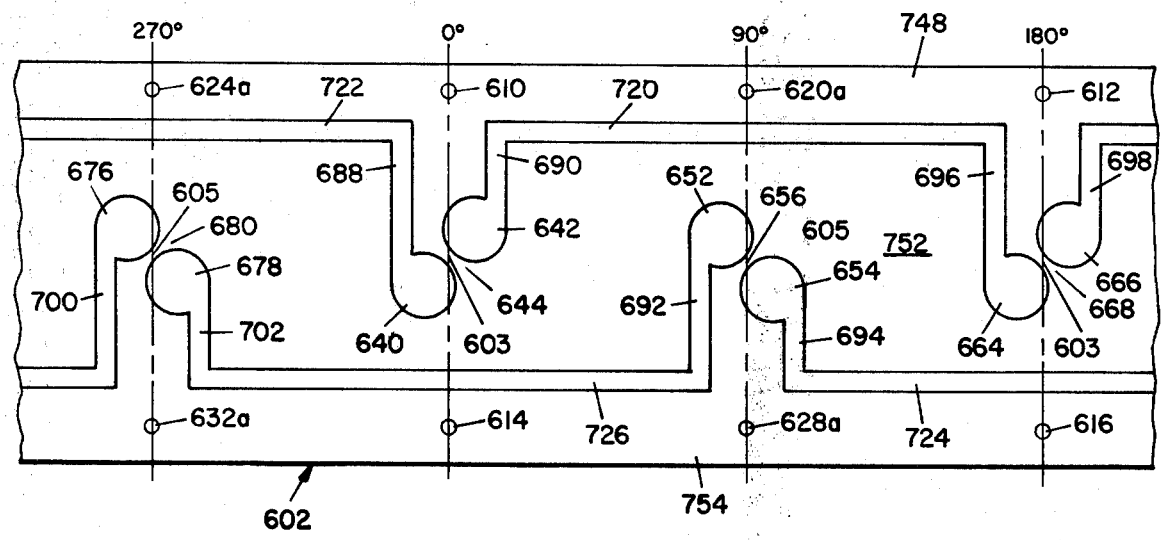
FIG. 16a, 16b and 16c are each a developed view of one of the tubular members, illustrating method of fabricating the embodiment of FIG. 15 and the layout of apertures and slots therein.
Figure 16B:
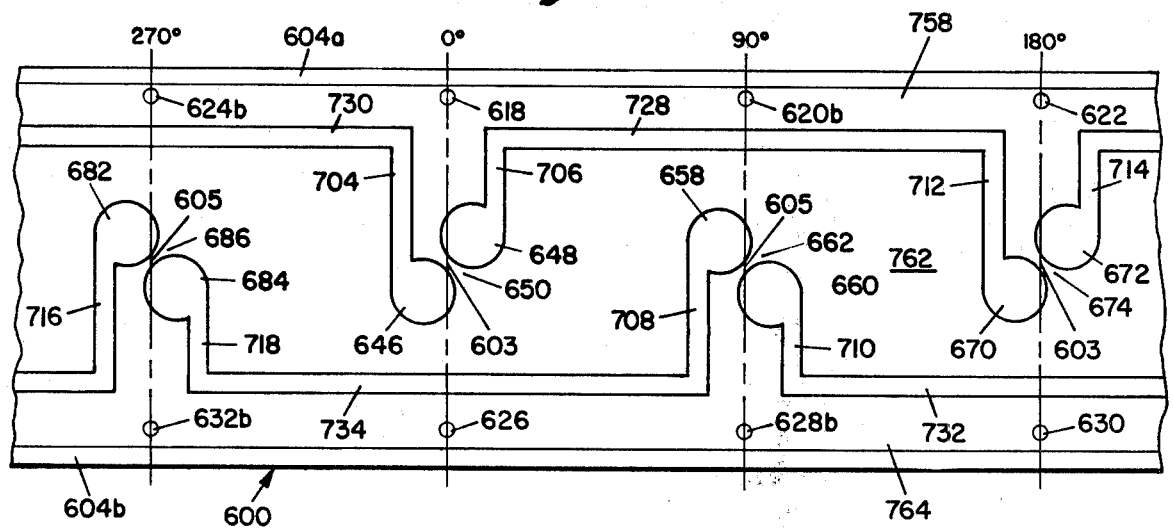

Radial indexing holes 610, 612, 614, 616, 618, 620, 620b, 622, 624, 624b, 626, 628, 628b, 630, 632 and 632b are drilled in members 600 and 602 as shown in FIGS. 16a and 16b. Of course, less than 16 radial indexing holes may be used for pinning members 600 and 602 together in a coaxial position. From FIGS. 16b and 16c it may be seen that, upon completion of apertures and slots, inner tubular member 600 will be rotated through an angle of 90°. The minimum number of radial indexing holes needed to pin members 600 and 602 in the zero position and the 90° position may be drilled. This symmetry of the sixteen radial indexing holes shown in FIGS. 16a and 16b would minimize handling of members 600 and 602 in that no special orientation of the members is needed to begin drilling apertures.

Figure 16C:
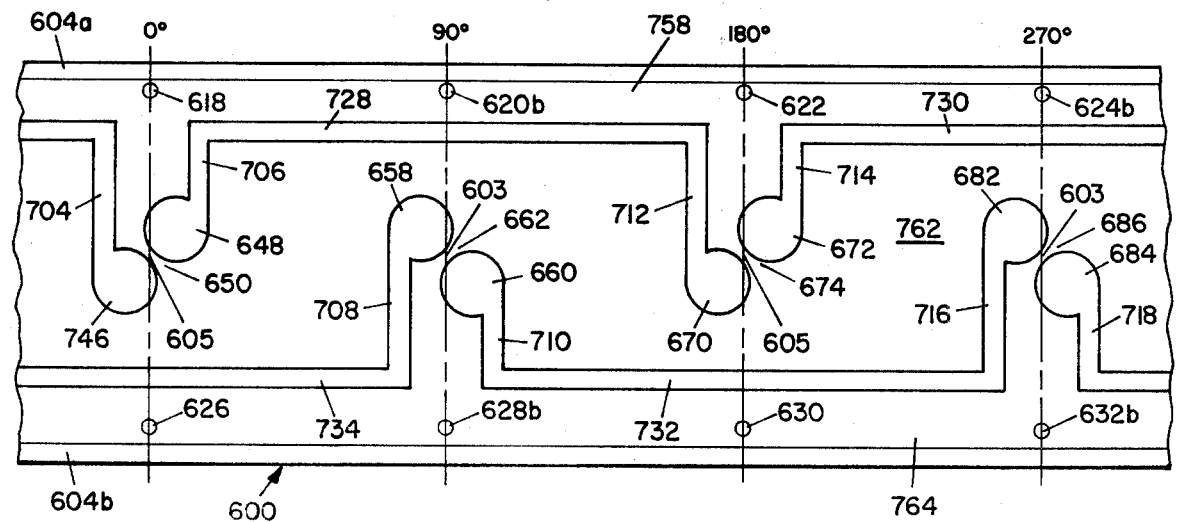

Members 600 and 602 are mounted on a spud 613 (not shown) and apertures and flexure blades are formed in the manner described above in connection with FIGS. 1 through 8. Note that for the embodiment of FIGS. 16 and 17, the developed view of the two tubular members, as seen in FIGS. 16b and 16c has a hole pattern for a two gimbal flexure hinge assembly and that the two tubular members will be rotated through an angle of 90° after the holes and the slots have been formed. This is another variation of the method of the invention. By comparison, the embodiment with corresponding illustrations in FIGS. 10b and 10c has a hole pattern also for a two gimbal flexure hinge assembly but in which the rotation is through an angle of 180° after the apertures and the slots have been formed.

The embodiment of FIGS. 15 and 16 is adapted to cancel rectification torques caused by angular vibrations at twice the spin speed of the rotating flexure hinge assembly. Cancellation of such rectification torques arising from angular vibrations at twice the rotor spin speed is taught and claimed in U.S. Pat. No. 3,678,764. From FIGS. 16b and 16c it may be seen that at each 90° interval around the circumference of the tubular elements of this embodiment there is a pair of radially adjacent flexure blades with one of each pair of blades being shaft-attached and one of each pair of blades being rotor-attached according to the teachings of U.S. Pat. No. 3,678,764.

Note that the axial and peripheral slots in members 600 and 602 may be formed without separating the members. Reference is made to step 17 in Table 2. The slots may be formed with the members in a coaxial and telescoped, i.e., concentric position because each slot in inner tubular member 600 is in radial alignment with a corresponding adjacent slot in outer tubular member 602.

A flexure hinge assembly is formed by bonding outer driving elements 748 to flange 604a which is in turn bonded to inner driving element 758. Outer driven element 754 is bonded to flange 604b which is in turn bonded to inner driven element 764. Of course, the embodiment of FIGS. 15 and 16 is symmetrical and the element at either end may be identified as the driving element or the driven element. A hub (not shown) with an aperture having a centerline along the common axis 601 may be bonded inside the inner, i.e., the driving element 758 for connecting to a drive shaft. A rotor element (not shown) may be bonded to the outer surface of the outer driven element 754.

The embodiment for which developed views of the cylindrical walls are shown in FIGS. 17a, b and c also utilizes two right circular cylinders for inner and outer tubular members 800 and 802, respectively. The embodiment of FIGS. 17a, b and c is identical to the embodiment of FIGS. 15–16 except that it is a one gimbal embodiment. The differences in this embodiment are the omission of the spacer flanges between members 800 and 802, the machining of the outer diameter of inner tubular member 800 and the inner diameter of outer tubular member 802 to a "push-fit" tolerance when the members are telescoped together, the layout of the pattern of apertures which requires a rotation of 180° by the members with respect to one another after the apertures and slots have been formed and alternating shaft-attached and rotor-attached flexure blades at 90° intervals about the circumference of the flexure hinge assembly.

Note that in this embodiment the flexure hinge assembly is formed by combining, in a concentric arrangement as in the other above-described embodiments, the two tubular elements, the mutual positioning being such that the combination is represented by the superposition of FIGS. 17a and 17c, i.e., inner element has been rotated by 180° after the apertures and slots have been made. Then, the assembly is completed by bonding the driving elements 948 and 958 to one another, bonding the gimbal elements 952 and 962 to one another and bonding the driven elements 954 and 964 to one another.

Reference is made to FIGS. 18-23. The embodiment shown in FIGS. 18-23 is a flexure hinge assembly having two intermediate gimbal elements. Inner tubular member 1000 comprises a right circular cylinder connected only by flexure blades between a pair of discs 1162a and 1162b, of which each forms part of a gimbal element. The inner diameter of the right circular cylinder is slightly smaller than the inner diameter of each of the discs. The outer tubular member 1002 is a right circular cylinder. In fabricating the embodiment of FIGS. 18-23 according to the novel method of the invention, the inner and outer tubular members 1000 and 1002 are machined to a "push-fit" tolerance between the inner diameter of outer tubular member 1002 and the outer diameter of the two discs 1162a and 1162b of inner tubular member 1000. The center portion of the outer tubular member comprises outer driven element 1154. The ends of outer tubular member 1002 each comprise a portion of the gimbal element 1152a and 1152b. The right circular cylinder portion of inner tubular member 1000 comprises inner driving element 1158. Each element portion 1162a and 1162b comprises a portion of a gimbal element. The internal, cylindrical surface of the inner driving element 1158 fits onto, and is secured to a drive shaft (not shown), but the drive shaft does not contact the inner surfaces of the discs 1162a and 1162b because their diameters exceed that of inner driving element 1158, see FIG. 23.

Two gimbal elements will be formed by rigidly connecting radially adjacent gimbal element portions 1152a and 1162a to one another, the resulting gimbal element being hereinafter referred to as "upper gimbal element" and similarly gimbal element portions 1152 and 1162b are joined to one another to form what is hereinafter referred to as the "lower gimbal element". A rotor (not shown) is attached to outer driven element 1154.

The structure shown in FIGS. 18-23 is taught and claimed in a co-pending application, Ser. No. 673,745 filed this same day, Apr. 5, 1976, by Stanley F. Wyse, entitled "Dual-Gimbal Gyroscope Flexure Suspension, and assigned to the same assignee. That application is now U.S. Pat. No. 4,062,600 which issued Dec. 13, 1977. The subject matter of this copending application is summarized below. The teaching of U.S. Pat. No. 3,856,366 may also be relevant to this embodiment.

The embodiment of FIGS. 18-23 is a flexure hinge assembly having two gimbal elements which are symmetrically arranged and thus each has its center of gravity displaced at one, distinct side on the axis 1001, i.e., at the same distance from the overall center of gravity 1007 of the flexure hinge assembly. In each of the above-described embodiments having two gimbal elements the center of gravity of each of the two gimbal elements is located at a common pivot point of the hinge assembly. Axial displacement of the center of gravity of each individual gimbal element in opposite directions from the overall center of gravity would give rise to a source of error not present in the embodiments having two gimbal elements as described above, unless compensated. More particularly, a rectified error torque would be created by linear vibrations in the direction of the longitudinal, common axis 1001, which is normally the spin axis, occurring at twice the spin frequency of an operating flexure hinge assembly.

The embodiment of FIGS. 18-23 is adapted to cancel rectified torques arising from linear vibrations along the shaft axis and from angular vibrations about the shaft axis both occurring at twice the frequency of rotation of the flexure hinge assembly in operation.

With respect to cancellation of torques arising from angular vibrations about the longitudinal axis of the flexure hinge assembly, the embodiments of FIGS. 18-23 is within the generic class of flexure hinge assemblies taught and claimed in U.S. Pat. No. 3,678,764.

According to the teaching of the co-pending application by Stanley F. Wyse, error torques arising from linear vibrations at twice the rotor spin speed are cancelled by axially displacing the rotor-attached flexure hinges of each of the two gimbal elements in opposite directions from the geometric center 1007 and overall center of gravity of the hinge assembly. Each rotor-attached flexure hinge is displaced by a predetermined distance toward the gimbal element which it connects to the rotor.

The displacement of the center of gravity of the upper and lower gimbal elements of the embodiment of FIGS. 19-24 in opposite directions from the overall center of gravity 1007 of the flexure hinge assembly results in a torque on a rotor (not shown) when the rotor is acted upon by an acceleration. This torque is sinusoidal at the excitation frequency and is proportional to the weight of the displaced gimbal element and to the distance of the center of gravity of that gimbal element from the common pivot point 1007, and proportional to the magnitude of the acceleration. If the vibration is at twice the rotational frequency, the resulting sinusoidal torque is rectified, and a steady state error torque is experienced by the rotor. Even though the two gimbal elements of the flexure hinge assembly are symmetrically placed so that they are at distances from the common pivot point 1007, the steady state torque as described does not normally cancel because the gimbal elements are phased 90° apart relative to the drive shaft (not shown) of the flexure hinge assembly. This 90° angular separation of the gimbal elements is necessary in order to achieve cancellation of rectified torques arising from angular vibrations of the drive shaft, flexure hinge assembly and rotor which occur at twice the rotational frequency of the rotor, i.e., the spin frequency.

Rectified error torques arising because of the displacement of the gimbal elements in opposite axial directions from the common pivot point 1007 are compensated and cancelled according to the teachings of the referenced co-pending patent application, by axially offsetting the flexure hinges, and therefore the flexure axes of the rotor-attached flexure hinge of each gimbal element. The flexure axis of the rotor-attached flexure hinge of each gimbal is axially offset in a direction towards the gimbal element by a predetermined distance epsilon. The distance is given by:

$$\epsilon = L_G - W_G/W_{FW}$$

Wherein:
$L_G$ = distance of gimbal center of gravity from its shaft connecting pivot point on the longitudinal axis;
$W_G$ = weight of gimbal
$W_{FW}$ = weight of rotor (not shown)

The co-pending patent application includes a more detailed discussion of the theory of this cancellation of error torques arising due to linear vibrations at twice the rotor rotational frequency, i.e., spin frequency.

From FIGS. 20 and 21 it may be seen that the slot cuts in tubular members 1002 and 1000 must be made separately. More particularly, tubular members 1000 and 1002 must be disengaged from their coaxial position, because the slot cutting steps, set forth as steps 17 through 31 in Table 1, must be separately performed for members 1000 and 1002.

Thus, the novel method of the invention has been applied to the embodiment shown in FIGS. 1-8; FIGS. 9-14; FIGS. 15-16; FIG. 17; and FIGS. 18-23. From the foregoing discussion it may be seen that the novel method may be applied to the fabrication of numerous different designs of flexure hinge assemblies having various orientations of aperture patterns forming flexure blades, and also having various modifications of interconnecting slots, gimbal elements, driving elements and driven elements.

Consider now the preferred method which is applicable to making some of the embodiments shown in the drawings. The preferred method is applicable to the fabrication of any embodiment of a flexure hinge assembly having coaxial tubular members with apertures forming flexure blades wherein the apertures forming flexure blades on opposite sides of the tubular members may be formed with one pass of a tool. For example, in FIG. 2 the EDM tool 41 may be plunged to form not only apertures 40 and 42 and 46 and 48 but it may be plunged through the opposite walls of the tubular members to form apertures 70 and 72 and 64 and 66 in inner and outer tubular members 00 and 02, respectively, seen in FIG. 3. The corresponding apertures of the embodiment shown in FIGS. 9-13 may also be formed with one pass of the tool provided that tubular member 216 is a separate spacer member, subsequently added, and not a portion of outer tubular member 202. The preferred method is inapplicable to the embodiment shown in FIG. 14 and in FIGS. 15-16 because the corresponding apertures on opposite sides of the tubular members are not in alignment. The preferred method is applicable to the embodiments shown in FIG. 17 and in FIGS. 19-23. In general, the preferred method is applicable to any embodiment of such a flexure hinge assembly wherein the coaxial tubular members are rotated through an angle of 180° to form apertures with flexure blades therebetween, provided there is no structural member between the apertures on opposite sides of the tubular members which can not be fabricated separately.

Preferably, the preferred method is practiced using an EDM machine which has a wire tool rather than a cutting tool as shown in FIG. 2. Any EDM tool is subject to wear with use. Plunging tool 41 as shown in FIG. 2 through opposite walls of inner and outer tubular members 00 and 02 would tend to wear tool 41 in a pointed manner. Tool 41 would tend to become pointed because part of the tool would pass through four walls of the coaxial tubular members and another part of the tool would pass through only two walls. A wire EDM machine uses a continuously moving roll of wire under tension as the cutting edge. Such a machine is available from The Seaboard Machinery Co., 2923 Supply Avenue, Los Angeles, California, Model No. Agie-Cut DEM 15 or from Machinery Sales Co., 2838 Leonis Boulevard, Los Angeles, California, Charmilles Model No. F40-DNC.

Table 2 summarizes the preferred method of making some of the embodiments shown in the drawings. Steps 9-16 pertain to fabrication of a flexure hinge assembly only by the use of a wire EDM machine. If the preferred method is practiced by plunging tool 41 through four walls of coaxial tubular members, steps 9-16 of Table 2 may be omitted and the apertures referred to in step 17 and 18 may be formed by one plunge of tool 41. Similarly, the apertures referred to in steps 20 and 21 may be formed by one plunge of tool 41.

Steps 1-8 of the preferred method are the same steps as steps 1-8 of the more general methods summarized in Table 1 and discussed above.

In the next step of the preferred method, starter holes for forming apertures are formed in coaxial inner and outer tubular members 00 and 02. More particularly, a small hole having a diameter large enough to pass the wire of the EDM machine is drilled within the desired surface outline for aperture 40. The starter hole (not shown) may be drilled at the point of the desired centerline for aperture 40 and is drilled through outer tubular member 02 and then through inner tubular member 00. In steps 9-16 of Table 2, starter holes are drilled for apertures at one location on the circumference of outer tubular member 02 and then the tubular members are both rotated through an angle of 90°. The next set of starter holes is then formed. This procedure is continued until starter holes have been drilled at spacings of 90° about the circumference of outer tubular member 02. Of course, steps 9 and 13 could be performed together by drilling apertures 40, 46, 72 and 66 in one pass of the drill, etc. Similarly, steps 11 and 15 could be combined. In forming starter holes either according to the method set forth in steps 9-16 of Table 2 or as discussed just above, the coaxial tubular members are both rotated through the same angle wherever a rotation is required. In forming starter holes, the coaxial tubular members are not rotated with respect to one another.

Next, the cutting wire of the wire EDM machine is threaded through the starter holes for apertures 40, 46, 72 and 66. The wire is then drawn through the starter holes as it is moved to cut the pattern of these apertures. Preferably, the pattern for cutting the apertures is computer controlled so that the apertures may be cut with great precision. For those embodiments which have slots in opposite sides of the coaxial tubular members which are in alignment, the wire EDM cutting technique may be used to also cut these slots. For example, without rethreading the wire, apertures 40, 46, 72 and 66 may be cut in the desired patterns and the wire may then proceed to cut slots 88, 104, 114 and 98. It is noted that this slot cutting technique is applicable to the embodiment of FIG. 17 but not applicable to the embodiments of FIGS. 9-13 and FIGS. 18-23.

Apertures 42, 48, 70 and 64 and slots 90, 106, 112 and 96 are formed in a similar manner by threading the EDM cutting wire through the starter holes for the apertures and controlling the cutting pattern by a computer. At the conclusion of this step four flexure blades along axis 03 have been formed by cutting apertures, i.e., flexure blades 44, 50, 74 and 68.

Inner and outer tubular members 00 and 02 are then both rotated 90° without changing the relative position of one member with respect to the other. It will be recalled that the members were pinned to one another in step 7.

Apertures 52, 58, 84, and 78 and slots 92, 108, 118 and 102 are cut by the moving EDM wire in the manner discussed above. Similarly, apertures 54, 60, 82 and 76 and slots 94, 110, 116 and 100 are cut by moving EDM wire. Inner and outer tubular members 00 and 02 may then be rotated back into their original orientation.

Remaining fabrication steps, in applying the preferred method, are identical to the general method set forth in Table 1. Step 23 of Table 2 refers to various steps of the method as it continues with a step of Table 1 as the next step in the fabrication process, depending upon a particular embodiment. In fabricating the embodiment of FIGS. 1-8, step 24 is next because the slots parallel to the longitudinal axis 01 have been cut. In fabricating the embodiment of FIGS. 9-13, step 17 of Table 1 is the next step, because parallel slots have not been cut since they were not in alignment. The preferred method is inapplicable to the embodiment of FIG. 14 and to FIGS. 15-16, so that step 9 of Table 1 is the next step in the general procedure. Steps 24 and 17 of Table 1 are the next steps in fabricating the embodiment of FIG. 17. The preferred method is not applicable to the embodiment of FIGS. 18-23.

Thus, there has been described above the fabrication of six embodiments of a flexure hinge assembly in accordance with the novel method of the invention. It is to be understood that the scope of the novel method is not limited by the above description nor by the reference to drawings. From the numerous applications of the method discussed above it may be understood that one could devise other embodiments of a flexure hinge assembly having pairs of orthogonally oriented flexure blades and to which the novel method of forming such flexure hinge assemblies would be applicable.

Figure 25:
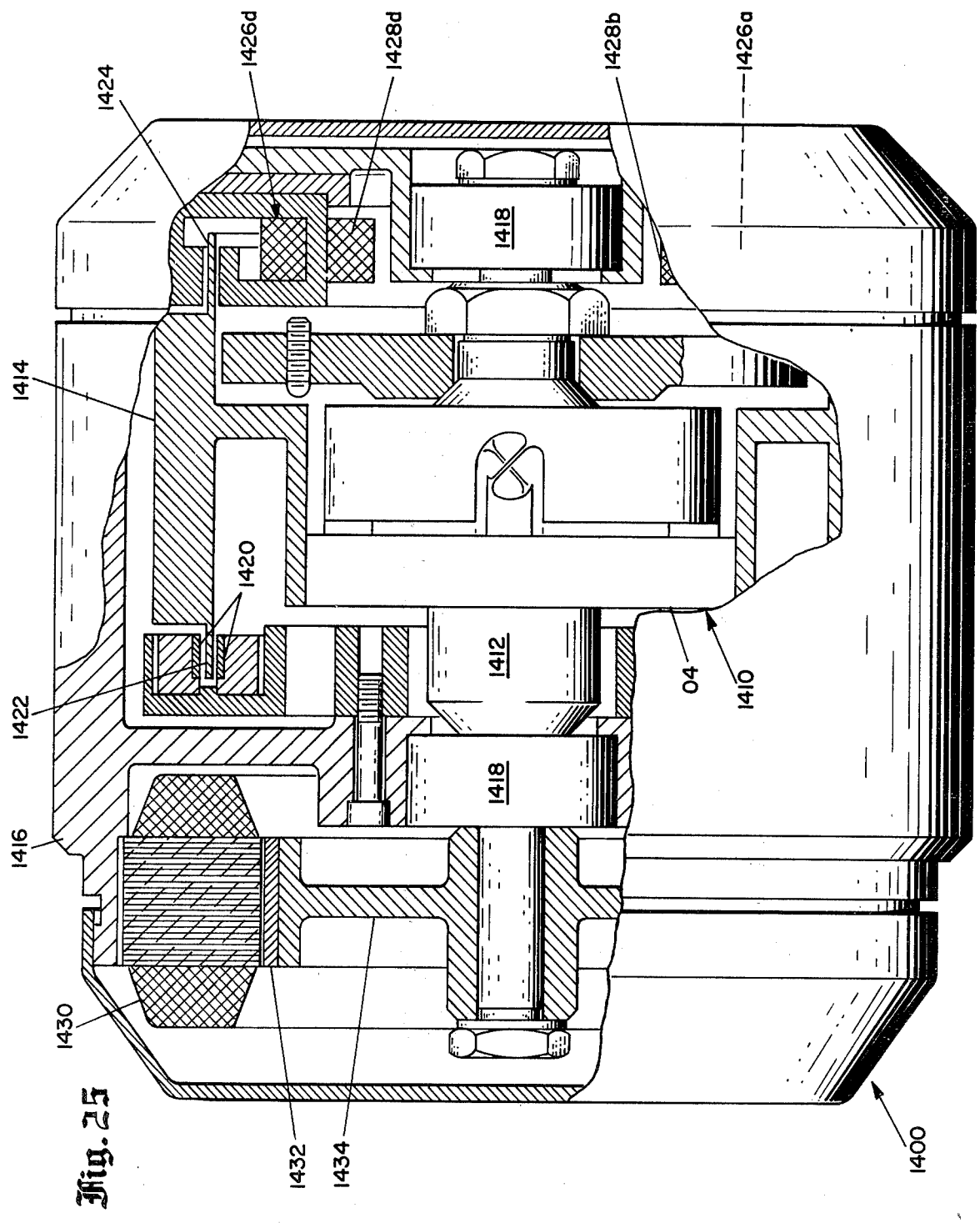
FIG. 25 is a cross section view of a gyroscope incorporating the completed embodiment of the flexure hinge assembly of FIGS. 5, 6, 7 and 8.

The novel method for fabricating flexure hinges may be used to produce the flexure blades of the flexure hinge assemblies shown in U.S. Pat. Nos. 3,354,725; 3,427,828; 3,527,062; 3,585,866; 3,614,894; 3,700,290, and 3,709,045. The applicability of the novel method to one or more of the flexure hinge assemblies shown in these patents would depend upon modifications of the patterns of flexure blades. For some of these devices this would mean modifying the pattern of apertures or apertures and slots. For example, a device based upon the one shown in U.S. Pat. No. 3,700,290 could be fabricated in accordance with the novel method by modifying the pattern of apertures and slots. More particularly, the pattern of apertures in the inner and outer tubular members could be modified. The pattern of flexure blades whose axes of symmetry are oriented alternately parallel and perpendicular to the longitudinal axis of rotation, as shown in FIG. 25, would permit fabrication in accordance with the novel method.

It is to be further understood that a flexure hinge assembly may be fabricated from coaxial members which are not right circular cylinders.

TABLE 1

| Method Steps | Embodiments/Elements | | | | | |
| --- | --- | --- | --- | --- | --- | --- |
| | FIGS 1-8 | FIGS 9-13 | FIG 14 | FIGS 15-16 | FIG 17 | FIGS 18-23 |
| 1. Grind outer diameter of inner tubular member | 00 | 200 | 400 | 600 | 800 | 1000 |
| 2. Drill hole(s) or shaft attachment to hub member: | | | | | | |
| inner; | 06 | 206 | *406 | N/A | N/A | 1006 |
| outer. | N/A | 208 | *408 | N/A | N/A | N/A |
| 3. Grind inner diameter of outer tubular member to | 02 "push fit" over 00 | 202 desired gap between 200 & 202 | 402 "push fit" | 602 desired gap between 600 & 602 | 802 "push fit" | 1002 "push fit" |
| 4. Telescope the inner and outer tubular members in a coaxial position | 00 and 02 | 200 & 202 | 400 & 402 | 600 & 602 | 800 & 802 | 1000 and 1002 |
| 5. Grind the inner and outer tubular members to the same length | 00 and 02 | 200 & 202 | 400 & 402 | 600 & 602 | 800 & 802 | 1000 and 1002 |
| 6. Drill indexing holes | 10 and 14; 12 and 16 | 210, 212, 218 & 230 | 410, 412, 428 & 430 | 610 & 618; 614 & 626; 620a and 620b; 628a and 628b; 612 | 810 & 818 814 & 826 820a and 820b; 828a and 828b; 812 | 1010 and 1018; 1014 and 1026; 1020a & b 1028a & b |

TABLE 1-continued

| Method Steps | Embodiments/Elements | | | | | |
|---|---|---|---|---|---|---|
| | FIGS 1-8 | FIGS 9-13 | FIG 14 | FIGS 15-16 | FIG 17 | FIGS 18-23 |
| | | | | and 622; 616 & 630; 624a and 624b; 632a and 632b | and 822; 816 & 830; 824a and 824b; 832a and 832b | 1012 and 1022; 1016 and 1030; 1024a & b 1032a & b |
| 7. Insert index pins in indexing holes | pin 33 into holes 10, 14 and 29; pin 35 into holes 12, 16 and 31 | pin 223 into holes 219 & 210; pin 225 into holes 221 & 212; pin 237 into holes 233 & 228; pin 239 into holes 235 & 230 | *pin 423 into holes *219 & 410; pin *425 into holes *421 and 412; pin 437 into holes *433 and 428; pin 439 into holes *435 and 430 | pin *633 into holes 610 and 618; pin *635 into holes 612 and 622; pin *637 into holes 614 and 626; pin *639 into holes 616 and 630 | pin *833 into holes 810 and 818; pin *835 into holes 812 and 822; pin *837 into holes 814 and 826; pin *839 into holes 816 and 830 | pin *1033 into holes 1010 and 1018; pin *1035 into holes 1011 and 1022; pin *1037 into hole 1014 and 1026; pin 1039 into holes 1016 and 1030 |
| 8. Mount inner and outer tubular members in coaxial position on holding spud and indexing block | 00 02 09 | 200 202 *209 | 400 402 *409 | 600 602 *609 | 800 802 *809 | 1000 1002 *1009 |
| 9. Make a pair of adjacent apertures in both the inner and in the outer tubular members to form a flexure blade in each. Apertures are formed in the inner and outer tubular member in a single pass of the tool | plunge tool 41 to form apertures 40 & 42; 46 and 48; and blades 44 and 50 | plunge tool *241 to form apertures 240 & 242, 246 & 248; blades 244 and 250 | plunge tool *441 to form apertures 440 & 442, 446 & 448; and blades 444 & 450 | plunge tool *641 to form apertures 640 & 642, 646 & 648; blades 644 and 650 | plunge tool *841 to form apertures 840 & 842, 846 & 848; and blades 844 & 850 | plunge tool *1041 to form apertures 1040 and 1042, 1046 and 1048; blades 1044 and 1050 at +ε location |
| 10. Change relative position of tool and inner and outer tubular members for forming another pair of adjacent apertures in both the inner and outer tubular members | rotate indexing block 09 90 degrees clockwise about axis 01. (no rotation about axis 05) | rotate indexing block *209 cw about axis 201 and 90° clockwise about axis 205 | rotate indexing block *409 90° cw about axis 401 and 90° cw about axis 405 | rotate indexing block *609 90° cw about axis 601 and 90° cw about axis 605 | rotate indexing block *809 90° cw about axis 801 and 90° cw about axis 805 | rotate indexing block *1009 90° cw about axis 1001 and 90° cw about axis 1005 |
| | (Clock Wise And Counter Clockwise Are Abbreviated CW and CCW, Respectively) | | | | | |
| 11. Make a pair of adjacent apertures in both the inner and outer tubular members to form a flexure blade in each | plunge tool 41 to form apertures 52 and 54; 58 and 60; and blades 56 and 62 | plunge tool *241 to form apertures 252 & 254 258 & 260 and blades 256 and 262 | plunge tool *441 to form apertures 452 and 454, 458 and 460; & blades 456 and 462 | plunge tool *641 to form apertures 652 & 654 658 & 660; & blades 656 & 662 | plunge tool *841 to form apertures 852 & 854, 858 & 860; & blades 856 & 862 | plunge tool *1041 to form apertures 1052 and 1054, 1058 and 1060 and blades 1056 and 1062 at −ε |
| 12. Repeat Step 10: i.e. rotate indexing block about axis and indicated number of degrees about axis | 09 01 90° cw 03 | *209 201 0° 203 | *409 401 90° cw 403 | *609 601 90° cw 603 | *809 801 0° 803 | *1009 1001 90° cw 1003 |
| 13. Repeat Step 9: i.e. plunge tool to form apertures apertures and blades | 41 64 and 66 70 and 72 68 and 74 | *241 264 & 266 270 & 272 268 & 274 | *441 464 & 466 470 & 472 468 & 474 | *641 664 & 666 670 & 672 668 & 674 | *841 864 & 866 870 & 872 868 & 874 | *1041 1064/1066 1070/1072 1068/1074 at +ε |
| 14. Repeat Step 10: i.e. rotate indexing block 90° cw about axis and indicated number of degrees about axis | 09 01 0° 05 | *209 201 90° ccw 205 | *409 401 90° cw 405 | *609 601 90° cw 605 | *809 801 90° ccw 805 | *1009 1001 90° cw 1005 |
| 15. Repeat Step 9: i.e. plunge tool to form apertures | 41 76 and 78 | *241 276 & 278 | *441 476 & 478 | *641 676 & 678 | *841 876 & 878 | *1041 1076/1078 |

TABLE 1-continued

| Method Steps | Embodiments/Elements | | | | | |
|---|---|---|---|---|---|---|
| | FIGS 1-8 | FIGS 9-13 | FIG 14 | FIGS 15-16 | FIG 17 | FIGS 18-23 |
| apertures | 82 and 84 | 282 & 284 | 482 & 484 | 682 & 684 | 882 & 884 | 1082/1084 |
| and blades | 80 and 86 | 280 & 286 | 480 & 486 | 680 & 686 | 880 & 886 | 1080/1086 at $-\epsilon$ |
| 16. Rotate indexing block to initial position 90° cw about axis and indicated | 01 | 201 | 401 | 601 | 801 | 1001 |
| number of degrees about axis (optional return to initial position of indexing block) | 90° ccw 03 | 0° 05 | 90° cw 403 | 90° cw 603 | 0° 803 | 90° cw 1003 |
| 17. Separate cylinders as indicated | No | Yes | Yes | No | No | No |
| plunge tool to form slots in the outer tubular member | 89 | *289 | *489 | *689 | *889 | *1089 |
| and slots in the inner tubular member | 88 and 90 104 and 106 with one pass of the tool | 288 & 290 304 & 306 by separate passes of the tool | 488 & 490 504 & 506 by separate passes of the tool | 688 & 690 704 & 706 with one pass of the tool | 888 & 890 904 & 906 with one pass of the tool | 1088/1090 1104/1106 in separate passes |
| 18. Rotate indexing block 90° cw about axis | 09 01 | *209 201 | *409 401 | *609 601 | *809 801 | *1009 1001 |
| 19. Plunge tool to form slots and slots | 89 92 and 94; 108 & 110; in one pass | *289 292 & 294 308 & 310 in separate passes | *489 492 & 494 508 & 510; in separate passes | *689 692 & 694 708 & 710; in one pass | *889 892 & 894 908 & 910; in one pass | *1089 1092/1094; 1108/1110 in separate passes |
| 20. Rotate indexing block 90° cw about axis | 09 01 | *209 201 | *409 401 | *609 601 | *809 801 | *1009 1001 |
| 21. Plunge tool to form slots and slots | 89 96 and 98; 112 & 114; in one pass | *289 296 & 298 312 & 314 separate pass | *489 496 & 498 512 & 514 separate pass | *689 696 & 698 712 & 714; in one pass | *889 896 & 898; 912 & 914; in one pass | *1089 1096/1098; 1112/1114; in separate passes |
| 22. Rotate indexing block 90° cw about axis | 09 01 | *209 201 | *409 401 | *609 601 | *809 801 | *1009 1001 |
| 23. Plunge tool to form slots and slots (Rotate indexing block 09 90° cw to initial position optional) | 89 100 & 102; 116 & 118 in one pass | *289 300 & 302; 316 & 318; in separate passes | *489 500 & 502; 516 & 518; in separate passes | *689 700 & 702; 716 & 718; in one pass | *889 900 & 902; 916 & 918; in one pass | *1089 1100/1102; 1116/1118; in separate passes |
| 24. Plunge tool to form slots in the outer tubular member | 119 120; | *319 320; | *519 520; | *719 720; | *919 920; | *1019 1020; |
| and slot in the inner tubular member | 128; in one pass | 328; in separate passes | 528; in separate passes | 728; in one pass | 928; in one pass | 1128; in separate passes |
| 25. Rotate indexing block indicated number of degrees about axis | 09 90° cw 01 | *209 90° cw 201 | *409 90° cw 401 | *609 180° cw 601 | *809 180° cw 801 | *1009 180° cw 1001 |
| 26. Plunge tool to form slot and slot | 119 122; 130; in one pass | *319 322; 330; in separate passes | *519 522; 530; in separate passes | *719 722; 730; in one pass | *919 922; 930; in one pass | *1119 1122; 1130; in separate passes |
| 27. Rotate indexing block indicated number of degrees about axis | 09 90° cw 01 | *209 90° cw 201 | *409 90° cw 401 | *609 90° cw 601 | *809 90° cw 801 | *1009 90° cw 1001 |
| 28. Re position tool along axis | No N/A | No N/A | No N/A | yes 601 | yes 801 | yes 1001 |
| 29. Plunge tool to form slot and slot | 119 124; 132; in one pass | *319 324; 332; in separate passes | *519 524; 532; in separate passes | *719 724; 732; in one pass | *919 924; 932; in one pass | *1119 1124; 1132; in one pass |
| 30. Rotate indexing block | 09 | *209 | *409 | *609 | *809 | *1009 |

TABLE 1-continued

| Method Steps | FIGS 1-8 | FIGS 9-13 | FIG 14 | FIGS 15-16 | FIG 17 | FIGS 18-23 |
|---|---|---|---|---|---|---|
| indicated number of degrees about axis | 90° cw 01 | 90° cw 201 | 90° cw 401 | 180° cw 601 | 180° cw 801 | 180° cw 1001 |
| 31. Plunge tool to form slot and slot | 119 126; 134; in one pass | *319 326; 334; in separate passes | *519 526; 534; in separate passes | *719 726; 734; in one pass | *919 926; 934; in one pass | *1119 1126; 1134; in separate passes |
| 32. Remove inner and outer tubular members from indexing block still pinned together | 00 002 | 200 202 | 400 402 | 600 602 | 800 802 | 1000 1002 |
| 33. Mount inner and outer tubular members for pass of a tool along axis | 00 and 02 pinned coaxially; 01 | 200 & 202 separately 201 | 400 & 402 separately 401 | N/A | N/A | N/A |
| 34. Plunge tool(s) to form outer hub; and inner hub; to form outer driving element to form outer gimbal element to form outer driven element to form inner driving element to form inner gimbal element to form inner driven element see Step 37) | 145 N/A 160 148a & b 152 154a & b 158a & b 162 164a & b | *345a&b 350 360 348a & b 352 354a & b 358a & b 362 364a & b | *545a & b *550 *560 548a & b 552 554a & b 558a & b 562 564a & b | N/A N/A N/A 748 752 754 758 762 764 | N/A N/A N/A 948 952 954 958 962 964 | N/A N/A N/A N/A 1152a&b 1154 1158 1162a & b N/A |
| 35. Mount inner and outer tubular members in coaxial position (see Step 7 above) remove indexing pins, rotate inner tubular member respect to outer tubular member by and reinsert index pins | N/A 00 02 180° | 200 202 200 202 180° | 400 402 400 402 90° | N/A 600 602 90° | N/A 800 802 180° | N/A 1000 1002 180° |
| 36 a. rigidly connect outer and inner to each other driving elements and outer and inner driven elements to each other | 148a and 158a; 148b and 158b; 154a and 164a; 154b and 164b | 348a & b; 358a & b to a *shaft thru hubs 350 & 360 respectively; 354a & 354b; 364a & 364b to a *rotor thru flanges 204 & 226 respectively (see FIG 9) | 548a & b; 558a & b to a *shaft thru hubs *550 & *560 respectively; 554a &554b; 564a & 564b to a *rotor thru flanges 404 & 426 respectively (see FIG 9) | 748 to 604a to 758; 754 to 604b to 764 | 948 to 958; 954 to 964 | N/A |
| 36. b. rigidly connect inner and outer gimbal element to each other | 52 to 62 | N/A | N/A | N/A | 952 to 962 | 1152a to 1162a; 1152 b to 1162b |
| 37. Remove indexing pins - see Step 7 for identity of pins | | first bond 200 & 202 to sleeve 217 | first bond 200 & 202 to sleeve 217 | | | |

TABLE 2

| Method Steps | FIGS 1-8 | FIGS 9-13 but separate member 216 | FIG. 14 | FIGS 15-16 | FIG. 17 | FIGS 18-23 |
|---|---|---|---|---|---|---|
| 1-8 Same steps in Table 1 | | | | | | |
| 9. Form starter holes in inner and outer tubular members for apertures (by drilling or EDM, etc.) | 40 & 46; 42 & 48 | 240 & 246 242 & 248 | Not Applicable | Not Applicable | 840 & 846 842 & 848 | Not Applicable |
| 10. Rotate tubular | 00 | 200 | N/A | N/A | 800 | |

TABLE 2-continued

| Method Steps | FIGS 1-8 | FIGS 9-13 but separate member 216 | FIG. 14 | FIGS 15-16 | FIG. 17 | FIGS 18-23 |
|---|---|---|---|---|---|---|
| members 90° cw | 02 | 202 | | | 802 | |
| 11. Form starter holes for apertures | 52 & 58<br>54 & 60 | 252 & 258<br>254 & 260 | N/A | N/A | 852 & 858<br>854 & 860 | |
| 12. Rotate tubular members 90° cw | 00<br>02 | 200<br>202 | N/A | N/A | 800<br>802 | |
| 13. Form starter holes for apertures | 64 & 70<br>66 & 72 | 264 & 270<br>266 & 272 | N/A | N/A | 864 & 870<br>866 & 872 | |
| 14. Rotate tubular members 90° cw | 00<br>02 | 200<br>202 | N/A | N/A | 800<br>802 | |
| 15. Form starter holes for apertures | 76 & 82<br>78 & 84 | | N/A | N/A | | |
| 16. Rotate tubular members 90° cw to original position (optional) | 00<br>02 | 200<br>202 | N/A | N/A | 800<br>802 | |
| 17. Form apertures and slots if slots are in alignment (by drawing EDM wire through starter holes to cut pattern of apertures and slots) | apertures 40, 46, 72, 66 and slots 88, 104, 114 & 98 | apertures 240, 246 272 & 266 | N/A | N/A | apertures 840, 846 872 & 866 and slots 888, 904, 914 and 898 | |
| 18. Form apertures and slots also if slots are in alignment | apertures 42, 48, 70 & 64 and slots 90, 106, 112 & 96 | apertures 242, 248, 270 & 264; | N/A | N/A | apertures 842, 848, 870 and 864 and slots 890 906, 912 and 896 | N/A |
| 19. Rotate inner and outer tubular members 90° cw | 00<br>02 | 200<br>202 | N/A | N/A | 800<br>802 | N/A |
| 20. Form apertures and slots also if slots are in alignment | apertures 52, 58, 84 and 78 and slots 92, 108, 118 and 102 | apertures 252, 258 284 & 278 | N/A | N/A | apertures 852, 858, 884 & 878 and slots 892, 908, 918 and 902 | N/A |
| 21. Form apertures and slots also if slots are in alignment | apertures 54, 60, 82 76 and slots 94, 110, 116 and 100 | apertures 254, 260, 282 and 276 | N/A | N/A | apertures 854, 860 882 and 876 and slots 894, 910, 916 and 900 | N/A |
| 22. Rotate inner and outer tubular members 90° ccw at original position | 00<br>02 | 200<br>202 | N/A | N/A | 8 | N/A |
| 23. Perform Method of Table 1 beginning at Step | 24 | 17 | 9 | 9 | 24 | 9 |

A DESCRIPTION OF A DEVICE EMBODYING THE INVENTION

Referring now to FIG. 25 there is shown a cross section of a free-rotor flexure-suspended gyroscope 1400, similar to the one described in U.S. Pat. No. 3,578,764, except that flexure hinge assembly 1410 has been substituted for the suspension means of this prior art gyroscope. Flexure hinge assembly 1410 is shown as the embodiment of FIGS. 1-8 but all of the embodiments shown herein, and other embodiments of the invention, may be utilized as the means for suspending the rotor of a gyroscope. The gyroscope shown in FIG. 25 includes, in addition to flexure hinge assembly 1410, a drive shaft 1412 and an inertial wheel 1414. The flexure hinge assembly 1410 interconnects drive shaft 1412 and inertial wheel 1414. Inertial wheel 1414 may be bonded to flange 04 of flexure hinge assembly 1410.

The operating principle of the gyroscope is based on angular decoupling of its spinning rotor such as inertial wheel 1414, from the drive shaft 1412. To explain this concept, consider the connection between the wheel and shaft to be a frictionless universal joint. In such a universal joint, there would be minimal restraint to angular motion between the wheel and the shaft. In addition, such a universal joint provides high resistance to translational motion parallel and perpendicular to the spin axis.

When the moment of inertia of each of the gimbal elements is adjusted in accordance with a tuning equation, the spinning rotor is free to deflect through small angles without experiencing reaction torques. Thus, a substantially frictionless universal joint is achieved. This concept is explained in more detail in U.S. Pat. No. 3,678,764. The dry, i.e. fluidless, tuned rotor feature eliminates all of the disadvantages of pigtail power leads, mass instability, radiation sensitivity, fluid stratification, gimbal pivots, etc. which are common to fluid-filled gyroscopes.

In FIG. 25 it can be seen that the inertial wheel 1414 is secured to flange 04 and as appears from FIG. 5, therefore to driven elements 154a, 154b, 164a and 164b and, in turn, through flexure blades to the gimbal elements 152 and 162, see FIGS. 5 and 8, and also FIG. 4. Gimbal elements 152 and 162, which are bonded together, are secured to the drive elements 148a, 148b, 158a and 158b by flexure hinges. The inertial wheel 1414 and flexure hinge assembly 1410 form the entire sensitive element. As shown in FIG. 9, the shaft 1412 is supported by a housing or case 1416 with a pair of preloaded ball bearings 1418. Ball bearings in this instrument are not part of the sensitive element and therefore have no influence on mass imbalance of the inertial wheel 1414.

Capacitance pickoffs comprising a plurality of plates 1420, in cooperation with flange 1422 of inertial wheel 1414, form four capacitor pairs for sensing angular displacement of the gyroscope housing relative to the rotor element. The pickoff signals may then be nulled by torquers and servo loops (not shown), thereby providing two axes of inertial stabilization or angular rate measurements. The four capacitance pickoffs are equiangularly spaced around the flange 1422 (only one pickoff being shown in FIG. 9).

A means for applying eddy current torque to the inertial wheel 1414 is shown in FIG. 9. A second conductive flange 1424 is positioned around and at the other side of inertial wheel 1414. Flange 1424 fits into the gaps of four circumferentially symmetrically disposed electromagnets 1426a, 1426b, 1426c, and 1426d (only magnet 1426d is shown in FIG. 9). Each of the electromagnets has a current-carrying coil which is connected to permit controlling the current by, for example, control means such as computers or servo means (not shown). The coils of the electromagnets are 1428a, 1428b, 1428c, and 1428d (two of which are shown in FIG. 9). The electromagnets are supported on a bracket secured to housing 1416. When it is desired to apply a torque to inertial wheel flange 1424 about an axis (not shown) passing through magnets 1426a and 1426c, magnets 1426a and 1426c are energized. The eddy currents induced in flange 1424 react with the magnetic field to produce this torque. When it is desired to apply a torque to flange 1424 about an axis (not shown) passing through the center of magnets 1426b and 1426d, magnets 1426b and 1426d are energized.

Isolation from external magnetic fields is provided by the selection of suitable material for the housing 1416 which may be made of a high-permeability steel.

The spin motor may be a three-phase hysteresis synchronous motor which thus drives the shaft 1412, flexure hinge assembly 1410, and inertial wheel 1414 at a desired. The spin motor comprises stator windings 1430, hysteresis ring 1432 and web 1434.

DISCUSSION OF THE PRIOR ART

The following U.S. Pat. Nos. relate to flexure hinge assemblies for use in gyroscopes: 2,995,938; 3,077,785; 3,301,073; 3,354,726; 3,427,828; 3,512,419; 3,527,062; 3,538,776; 3,585,866; 3,614,894; 3,678,764; 3,700,289; 3,700,290; 3,709,045; 3,811,172, 3,832,906 and 3,856,366. Not all of these patents relate to a flexure hinge assembly which has two coaxial tubular members.

There follows a discussion of those prior art patents which do have inner and outer coaxial tubular members and, more particularly, reference is made to the teachings of these patents which indicate that they are limited to the tubular members which are separately fabricated complete with apertures and slots and only then i.e. subsequently they are mounted together in a coaxial position.

The claims set forth below claim a novel flexure hinge assembly and a method of making the assembly. The assembly has an arrangement of apertures forming flexure blades and slots dividing the tubular members into driving, gimbal and driven elements which permit the flexure blades to be precisely formed while the two tubular members are in a coaxial position. According to the novel method of fabrication, the flexure blades are formed with the tubular members mounted in a first relative angular, coaxial position and the flexure hinges are formed by rotating the tubular members with respect to each other into a second relative angular, coaxial position. Claims drawn to the novel flexure hinge assembly and to the novel method of fabrication distinguish over prior art teachings of separately fabricating the inner and outer tubular members of a flexure hinge assembly and then coaxially mounting these members.

U.S. Pat. No. 3,354,726; column 5; lines 3-15. "Upper gimbal 152 is disposed radially outwardly of and fixedly connected to upper gimal 110, . . . Lower gimbal 154 is disposed radially outwardly of and is fixedly connected to lower gimbal 112, . ." See also U.S. Pat. No. 3,427,828; column 1; lines 45-53 describing the method of making the flexure hinge assembly shown in U.S. Pat. No. 3,354,726. The pattern of flexure blades shown in FIGS. 5-14 is such that it would not be possible to form the pairs of apertures which leave the inner and outer flexure blades therebetween and then rotate the inner and outer members with respect to each other to form flexure hinges. More particularly, the longitudinal axes of the inner flexure blades are all parallel to the axis of rotation of the flexure hinge assembly and the longitudinal axes of the flexure blades in the outer member are all perpendicular to the axis of rotation. There is no possible orientation of the telescoped tubular members where the apertures forming both the inner and outer flexure blades could be made.

U.S. Pat. No. 3,427,828; column 1; lines 60-65 and column 2; lines 1-5. The referenced portions of this patent indicate that the teaching is limited to making a hinge unit for radial support only. It appears that the device disclosed in U.S. Pat. No. 3,427,828 is intended to be substituted as an improvement for the outer tubular member shown in FIG. 13 of U.S. Pat. No. 3,354,726. Lines 10-16 of column 3 of U.S. Pat. No. 3,427,828 teach the fabrication of radial webs 21, 22, 23 and 24 by rotating a blank inserted between two jigs 30 and 34 in directions shown by arrow 38 and 40. Arrows 38 and 40 indicate rotation about the longitudinal axis of the flexure hinge assembly. FIGS. 2, 3 and 4 indicate the radial webs 21, 22, 23 and 24 each have a longitudinal axis (i.e., a flexure plane) perpendicular to the axis of rotation of the flexure hinge assembly. Such a device and method of fabrication therefor differ from the claimed device and the claimed method in the manner discussed above.

U.S. Pat. No. 3,527,062; column 2; lines 41-46. The hinge unit is described as an outer flexure hinge unit having three gimbals. It appears from this teaching and from the figures that U.S. Pat. No. 3,527,062 discloses only an outer hinge unit which must be utilized in conjunction with an inner hinge unit as taught by U.S. Pat. No. 3,354,726. For example, FIG. 7 shows a pattern of flexure blades wherein the flexure plane of each flexure blade is perpendicular to the axis of rotation of the hinge unit.

U.S. Pat. No. 3,585,866; FIG. 2. FIG. 2 shows a pattern of flexure blades wherein the flexure planes of all the flexure blades in one tubular member are perpendicular to the axis of rotation of the hinge unit and the flexure planes of all the flexure blades of the other tubular member are parallel to the axis of rotation. In column 2, lines 55-60 of this patent it is stated that the holes machined in each hinge portion to form the flexure elements therein are machined through instead of being "blind". Consequently, when the two hinge portions are assembled together, easy visual alignment between the corresponding flexure elements in each unit may be achieved. Thus, it is shown that the inner and outer tubular members are separately fabricated.

U.S. Pat. No. 3,614,894; column 5; lines 5-10 and column 6; lines 40-44. In column 5 it is taught that all the flexure bars in the outer hinge unit have their respective longitudinal axes parallel to the Z axis, whereas flexure bars in the inner hinge unit have their corresponding longitudinal axes respectively normal to the Z axis. Such an arrangement of flexure blades cannot result in a flexure hinge assembly as claimed herein. In column 6 it is stated that the inner and outer hinge units are immediately and permanently joined together in a fixed and rigid manner subsequent to the machining of holes 64 through 92 in each corresponding unit, respectively. Thus, it is taught that the holes are machined in each unit separately and then the units are fixed together, contrary to the subject matter claimed herein.

U.S. Pat. No. 3,700,289; column 4; lines 1-5 and column 5; lines 44-50. In column 4 it is stated that, in manufacture, the hinge units 10 and 40 are machined to their appropriate sizes and the various bores drilled therethrough. The inner hinge unit 10 is placed within the outer hinge unit 40 with their boards in the proper position and each unit bonded together in a conventional manner such as by electron beam welding, cementing, etc., along one or more circumferential joints. In column 5 it is stated that the assembly of FIGS. 6-10 is manufactured by a method described in connection with FIG. 11 of the drawings. In particular, the tubular members 110 and 140, which have been previously ground and finished to form the various holes therethrough, are telescopes one within the other and fixed together, as shown in FIG. 11.

U.S. Pat. No. 3,700,290; column 5; lines 23.32. In column 5 it is stated that in the assembly of the device of the invention according to this patent the various boards (such as 24a, 24b, etc.) are initial machined through the inner hinge unit 20 and the outer hinge unit 50 by a suitable jig grinding mandril. The outer hinge unit 50 is then placed over, and welded with respect to, the inner hinge unit 20 along the circumferential welds 80 and 82, it being understood that the wedges or the like can be utilized to assure precise alignment of the two units before welding.

U.S. Pat. No. 3,709,045; column 2; lines 43-47. It is stated therein that the lower gimbal 18 of the outer hinge unit is fixedly connected to the lower gimbal 26 of the inner hinge unit, and the upper gimbal 22 of the outer hinge unit is fixedly connected to the upper gimbal 30 of the inner hinge unit. There does not appear to be any teaching of when these fixed connections are made. However, FIG. 5 shows an outer hinge unit having all of its flexure blades oriented with their flexure planes perpendicular to the axis of rotation of the hinge unit. Such a pattern of flexure blades differs from the claimed structure and could not be produced by the method claimed herein.

U.S. Pat. No. 3,811,172; column 4; lines 3-10 and column 5; lines 45-51. U.S. Pat. No. 3,811,172 is a division of U.S. Pat. No. 3,700,289 and the foregoing remarks regarding U.S. Pat. No. 3,700,289 apply equally to this patent.

U.S. Pat. No. 3,856,366; column 1; lines 30-40. The referenced lines state that in the assembly to be described in that patent, and in the assembly described in the patent U.S. Pat. No. 3,585,866 the flexure bars are formed in each of the tubular hinge members by corresponding pairs of closely spaced apertures which extend through the wall of each hinge member. Then, when the two tubular hinge members are nested within one another and rigidly fastened to one another, an appropriate orthogonal alignment between the flexure bars of the inner and outer members is established so that the two tubular hinge members may operate in there intended manner.

See also column 3; lines 50-68 and column 4; lines 1-5. It is evident from the referenced lines and from FIG. 1 that the device taught and shown in U.S. Pat. No. 3,856,366 is different from the device and would not be produced by the method disclosed and claimed herein. More particularly, the flexure axes of the inner and outer tubular members do not intersect at a common pivot point. The referenced lines teach gimbal flywheel flexure bars (flexure blades) which are located with their flexure axes intersecting the axis of rotation at different points. Therefore, the apertures of the inner and outer tubular members are not radially adjacent and could not be made by drilling or other machining steps through telescoped inner and outer tubular members.

Thus it is seen that the structures described in these prior art patents differ from the structure and could not be produced by practicing the method claimed herein.

We claim:

1. A method of fabricating a flexure hinge assembly comprising the steps of:

temporarily and releasably securing a pair of tubular members in a coaxially concentric aligned first relative angular position one within the other;

forming four pairs of circumferentially adjacent apertures equiangularly spaced around the circumference of the outer tubular member of said pair of tubular members to create four flexure blades in the wall of the outer tubular member and four pairs of circumferentially adjacent apertures equiangularly spaced around the circumference of the inner tubular member to create four flexure blades in the wall of the inner tubular member of said pair of tubular members, the wall of each aperture of the inner tubular member forming a flexure blade being substantially coplanar with the wall of a generally radially adjacent wall of an aperture in the outer tubular member forming another flexure blade;

rotating said tubular members through a predetermined first angle to a second coaxial relative angular position with respect to one another to create four equiangularly spaced flexure hinges each having a pair of flexure blades with substantially orthogonal axes of symmetry and a common, colineal flexure axis;

securing said tubular members to one another in said second position; and forming a plurality of slots in the walls of said inner and outer tubular members to divide said inner and outer tubular members into a driving element, at least one gimbal element and a driven element, at least a pair of flexure blades flexibly connecting said gimbal element to said driving element and at least a pair of flexure blades flexibly connecting said gimbal element to said driven element.

2. A method according to claim 1 wherein the steps claimed therein are proceeded by the step of forming at least a pair of radially adjacent indexing holes in said inner and outer tubular members having a common colineal first centerline and a third indexing hole in one of said inner and outer tubular members having a second centerline angularly spaced about the longitudinal axis of said coaxial inner and outer tubular members by said first predetermined angle, said first and second centerlines intersecting the longitudinal axis of said inner and outer tubular members at a common pivot point.

3. The method according to claim 2 wherein the step of securing said inner and outer tubular members in said first position comprises inserting an indexing pin in first and second one of said indexing holes.

4. The method according to claim 3 wherein the step of securing said inner and outer tubular members in said second coaxial position comprises inserting an indexing pin through said third indexing hole and through one of said first and second indexing holes.

5. The method according to claim 6 wherein the step of forming four pairs of circumferentially adjacent apertures in said outer tubular member and four pairs of circumferentially adjacent apertures in said inner tubular member includes the step of forming radially adjacent first and second apertures in said outer and inner tubular members respectively with one pass of a cutting tool and forming third and fourth radially adjacent apertures in said outer and inner tubular members respectively with one pass of the cutting tool said first and third apertures comprising a first pair of circumferentially adjacent apertures in said outer tubular member and said second and fourth apertures comprising a first pair of circumferentially adjacent apertures in said inner tubular member to create a first pair of first and second flexure blades in said outer and inner tubular members respectively.

6. The method according to claim 5 wherein the steps of forming first and second apertures in said outer and inner tubular members with one pass of a cutting tool and the step of forming third and fourth apertures in said outer and inner tubular members with one pass of a cutting tool are each repeated three times at equiangular spacing about the circumference of said outer tubular member to create second, third and fourth pairs of radially adjacent, coplanar flexure blades in said outer and inner tubular members.

7. The method according to claim 1 wherein the step of forming four pairs of circumferentially adjacent apertures in said outer tubular member and four pairs of circumferentially adjacent apertures in said inner tubular member includes simultaneously forming a first pair of circumferentially adjacent first and second apertures in said outer tubular member and simultaneously forming a second pair of circumferentially adjacent third and fourth apertures in said inner tubular member with one pass of a cutting tool, said first and third apertures having a colineal centerline and said second and fourth apertures having a colineal centerline to create a pair of first and second radially adjacent, coplanar flexure blades in said outer and inner tubular members, respectively.

8. The method according to claim 7 wherein the step of forming first and second apertures in said outer tubular member and third and fourth apertures in said inner tubular member with one pass of the cutting tool is repeated at each 90° spacing about the circumference of said outer tubular member to create second, third and fourth pairs of radially adjacent, coplanar flexure blades.

9. A method according to claim 7 wherein in the same pass of the cutting tool circumferentially adjacent fifth and sixth apertures and circumferentially adjacent seventh and eighth apertures are formed in the walls of the inner and outer tubular members, respectively, to create a second pair of third and fourth radially adjacent, coplanar flexure blades in said inner and outer tubular members, respectively, which are diametrically opposite to said first pair of flexure blades.

10. A method according to claim 9 wherein the step of forming first and second, third and fourth, fifth and sixth, seventh and eighth circumferentially adjacent apertures with one pass of the cutting tool is repeated at a spacing of 90° about the circumference of said outer tubular member to create two additional pairs of radially adjacent, coplanar flexure blades having a common colineal flexure axis.

11. A method according to claim 1 wherein the step of forming four pairs of circumferentially adjacent apertures in said outer tubular member and four pairs of circumferentially adjacent apertures in said inner tubular member includes simultaneously forming radially adjacent first and second apertures in the walls of said inner and outer tubular members and forming radially adjacent third and fourth apertures in the opposite walls of said inner and outer tubular members respectively with one pass of a cutting tool and simultaneously forming fifth and sixth radially adjacent apertures in the walls of said outer and inner tubular members respectively and forming seventh and eighth radially adjacent apertures in the walls on the opposite sides of said inner and outer tubular members, respectively, said first and fifth, second and sixth, third and seventh, and fourth and eighth apertures being circumferentially adjacent apertures to create a pair of radially adjacent, coplanar first and second flexure blades in walls of said outer and inner tubular members respectively and a second pair of third and fourth radially adjacent, coplanar flexure blades in the opposite walls of said inner and outer tubular members respectively.

12. The method according to claim 11 wherein the steps of forming first, second, third, and fourth apertures and forming fifth, sixth, seventh, and eighth apertures repeated at a spacing of 90° about the circumference of said outer tubular member to create a third pair of fourth and fifth radially adjacent, coplanar flexure blades in the walls of said outer and inner tubular members and to create a fourth pair of seventh and eighth radially adjacent, coplanar flexure blades in the opposite walls of said inner and outer tubular members respectively, said fifth, sixth, seventh, and eighth flexure blades having a common, colineal flexure axis.

13. A method according to claim 1 wherein the predetermined first angle of rotation has a magnitude of 90°.

14. The method according to claim 1 wherein the predetermined first angle of rotation has a magnitude of 180°.

15. The method according to claim 1 wherein alternate flexure hinges have a common, colineal flexure axis.

* * * * *

UNITED STATES PATENT AND TRADEMARK OFFICE
CERTIFICATE OF CORRECTION

PATENT NO. : 4,143,451

DATED : March 13, 1979

INVENTOR(S) : Robert J. G. Craig et al.

It is certified that error appears in the above—identified patent and that said Letters Patent is hereby corrected as shown below:

| | | |
|---|---|---|
| Column 14, | Line 14 | Remove "areas" and substitute therefor --aperture pairs as shown--; |
| | Line 21 | Remove "90°"; |
| Column 20 | Line 15 | Remove "620" and substitute therefor --620a--; |
| | Line 16 | Remove "624" and substitute therefor --624a--; |
| | Line 16 | Remove "628" and substitute therefor --628a--; |
| | Line 16 | Remove "632" and substitute therefor --632a--; |
| Column 21 | Line 47 | Remove "inner" and substitute therefor --outer--; |

UNITED STATES PATENT AND TRADEMARK OFFICE
CERTIFICATE OF CORRECTION

PATENT NO. : 4,143,451

DATED : March 13, 1979

INVENTOR(S) : Robert J. G. Craig et al.

It is certified that error appears in the above—identified patent and that said Letters Patent is hereby corrected as shown below:

| | | |
|---|---|---|
| Column 21, | Line 48, | Remove "inner" and insert therefor --outer--; |
| | Line 59, | Remove "element" and insert therefor --elements--; |
| Column 23, | Line 46, | Change "and FIGS. 18-23." to --FIGS. 18-23; and FIG. 24.--; |

IN THE CLAIMS:

| | | |
|---|---|---|
| Column 38 | Line 35 | After "of" and before "tubular", insert --inner and outer--; |
| | After Line 51, | Insert --forming a plurality of slots in the walls of said inner and outer tubular members to divide said inner and outer tubular members into a driving element, at least one gimbal element and a driven element, at least a pair of flexure blades flexibly connecting said gimbal element to said driving element and at least a pair of flexure blades flexibly connecting said gimbal |

UNITED STATES PATENT AND TRADEMARK OFFICE
CERTIFICATE OF CORRECTION

PATENT NO. : 4,143,451

DATED : March 13, 1979

INVENTOR(S) : Robert J. G. Craig et al.

It is certified that error appears in the above—identified patent and that said Letters Patent is hereby corrected as shown below:

| | | |
|---|---|---|
| | | elements to said driven element;--; |
| | Line 58, | After the semicolon, insert --and--; |
| | Line 60, | Remove "; and" and substitute therefor a period; |
| | Lines 61-68 | Delete. |
| Column 39 | Line 2 | Remove "proceeded" and substitute therefor --preceded--; |
| Column 39 | Line 22, | Remove "6" and substitute therefor --3--. |

IN THE DRAWINGS:

| | |
|---|---|
| FIG. 9 | Change "358a" to --358b--; |
| FIG. 10b | Change the solid line from 348b to a dashed line; |
| FIG. 13 | Change "358a" to --358b--; |
| FIG. 13 | Change "358b" to --358a--; |
| FIG. 12 | Delete "336" (both occurrences) and the lead lines connected thereto; |
| FIG. 14d | Change "403" (both occurrences) to --405--; |

UNITED STATES PATENT AND TRADEMARK OFFICE
CERTIFICATE OF CORRECTION

PATENT NO. : 4,143,451
DATED : March 13, 1979
INVENTOR(S) : Robert J. G. Craig et al.

It is certified that error appears in the above—identified patent and that said Letters Patent is hereby corrected as shown below:

| | |
|---|---|
| FIG. 14d | Change "405" (both occurrences) to --403--; |
| FIG. 15 | Change "620a" (only the upper left hand occurrence) to --624a--; |
| FIG. 16 | Shorten the lead line on 656; |
| FIG. 16a, | Connect a lead line from "605" to the position vacated by the end of the lead line from "656"; |
| FIG. 17 | Change "810a" to --820a--; |
| FIG. 24b | Change "1246" to --1248--; |
| FIG. 24b | Change "1248" to --1246--; |
| FIG. 24c | Change "1248" to --1246--; |

UNITED STATES PATENT AND TRADEMARK OFFICE
CERTIFICATE OF CORRECTION

PATENT NO. : 4,143,451

DATED : March 13, 1979

INVENTOR(S) : Robert J. G. Craig et al.

It is certified that error appears in the above—identified patent and that said Letters Patent is hereby corrected as shown below:

FIG. 24c     Change "1246" to --1248--;

FIG. 24c     Change "1203" to --1205--;

FIG. 24c     Change "1205" to --1203--.

Signed and Sealed this

Twenty-ninth Day of January 1980

[SEAL]

Attest:

SIDNEY A. DIAMOND

Attesting Officer     Commissioner of Patents and Trademarks

UNITED STATES PATENT AND TRADEMARK OFFICE
CERTIFICATE OF CORRECTION

PATENT NO. : 4,143,451
DATED : March 13, 1979
INVENTOR(S) : Robert J. G. Craig, et al.

It is certified that error appears in the above—identified patent and that said Letters Patent is hereby corrected as shown below:

Column 38, Line 51, insert

--forming a plurality of slots in the walls of said inner and outer tubular members to divide said inner and outer tubular members into a driving element, at least one gimbal element and a driven element, at least a pair of flexure blades flexibly connecting said at least one gimbal element to said driving element and at least a pair of flexure blades flexibly connecting said at least one gimbal element to said driven element;--.

Signed and Sealed this

Fifteenth Day of April 1980

[SEAL]

Attest:

Attesting Officer

SIDNEY A. DIAMOND
Commissioner of Patents and Trademarks